(12) United States Patent
Suzuki

(10) Patent No.: US 8,204,304 B2
(45) Date of Patent: Jun. 19, 2012

(54) COLOR GAMUT MAPPING BY FORMING CURVED CROSS-SECTIONAL SURFACES

(75) Inventor: Hiroaki Suzuki, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 602 days.

(21) Appl. No.: 12/453,583

(22) Filed: May 15, 2009

(65) Prior Publication Data

US 2009/0285475 A1    Nov. 19, 2009

(30) Foreign Application Priority Data

May 16, 2008  (JP) .................................. 2008-129832

(51) Int. Cl.
*G06K 9/00* (2006.01)
(52) U.S. Cl. ........................................ 382/167; 382/162
(58) Field of Classification Search .................. None
See application file for complete search history.

(56) References Cited

U.S. PATENT DOCUMENTS

| | | | |
|---|---|---|---|
| 5,831,751 A | 11/1998 | Ohneda et al. | |
| 6,005,970 A | 12/1999 | Ohneda et al. | |
| 6,023,527 A * | 2/2000 | Narahara | 382/167 |
| 6,075,885 A * | 6/2000 | Taniguchi et al. | 382/162 |
| 6,414,690 B1 * | 7/2002 | Balasubramanian et al. | 345/589 |
| 6,618,499 B1 * | 9/2003 | Kohler et al. | 382/162 |
| 7,003,176 B1 | 2/2006 | Suzuki et al. | |
| 7,345,787 B2 * | 3/2008 | Ito et al. | 358/1.9 |
| 7,626,723 B2 * | 12/2009 | Yamada et al. | 358/1.9 |
| 7,663,641 B2 * | 2/2010 | Sloan | 345/590 |
| 7,755,817 B2 * | 7/2010 | Ho et al. | 358/523 |
| 2004/0096104 A1 * | 5/2004 | Terekhov | 382/167 |
| 2005/0008258 A1 | 1/2005 | Suzuki et al. | |
| 2005/0024652 A1 * | 2/2005 | Gondek | 358/1.9 |
| 2005/0237544 A1 | 10/2005 | Suzuki et al. | |
| 2006/0170939 A1 * | 8/2006 | Misumi | 358/1.9 |
| 2006/0245016 A1 * | 11/2006 | Fukao et al. | 358/518 |
| 2009/0010534 A1 | 1/2009 | Suzuki | |

FOREIGN PATENT DOCUMENTS

| | | |
|---|---|---|
| JP | 10-290375 | 10/1998 |
| JP | 2004-234251 | 8/2004 |

OTHER PUBLICATIONS

Ryoichi Saito and Hiroaki Kotera "Image-dependent three-dimensional gamut mapping using gamut boundary descriptor" J. Electron. Imaging 13, 630 (2004).*

* cited by examiner

*Primary Examiner* — Li Liu
(74) *Attorney, Agent, or Firm* — Harness, Dickey & Pierce, P.L.C.

(57) ABSTRACT

An image processing apparatus is disclosed. The image processing apparatus includes a color profile forming device. The color profile forming device includes a curved surface and table forming section, a cross-sectional surface forming section, a mapping section, and a color profile forming section. The curved surface and table forming section forms a curved surface and forms a mapping table by point group setting. The cross-sectional surface forming section forms a cross-sectional surface of a second gamut. The mapping section performs mapping of a color signal group of a first gamut on the cross-sectional surface of the second gamut by referring to the mapping table. The color profile forming section forms an LUT for a user corresponding to a selected hue, a selected curved surface, and a selected mapping table, based on input and output images whose color signals have been converted by the mapping table.

20 Claims, 21 Drawing Sheets

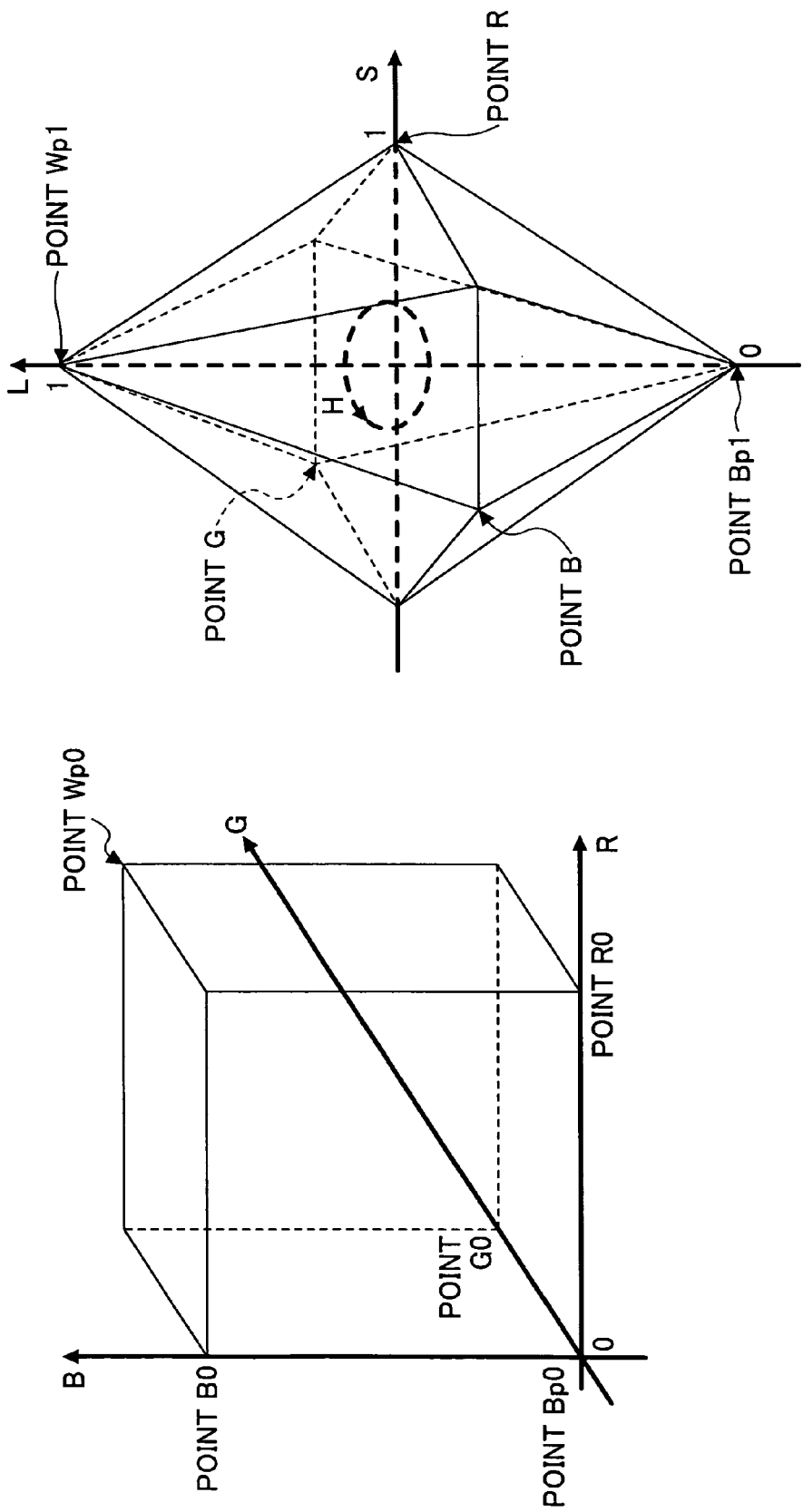

■ RGB ⇔ HLS

RGB ⊃ HLS

MAX = max(R, G, B)
MIN = min(R, G, B)
L = (MAX + MIN)/2
CASE WHERE MAX = MIN
  S = 0
  H = 0
CASE OTHER THAN MAX = MIN $$S = \begin{cases} (MAX - MIN)/(MAX + MIN) & L \leq 0.5 \\ (MAX - MIN)/(2-MAX - MIN) & L > 0.5 \end{cases}$$

Cr = (MAX − R)/(MAX − MIN)
Cg = (MAX − G)/(MAX − MIN)
Cb = (MAX − B)/(MAX − MIN)

$$H = \begin{cases} Cb - Cg & R = MAX \\ 2 + Cr - Cb & G = MAX \\ 4 + Cg - Cr & B = MAX \end{cases}$$

H = 60 × H
H = H + 360    H < 0

HLS ⊃ RGB $$MAX = \begin{cases} L \times (1 + S) & L \leq 0.5 \\ L \times (1 - S) + S & L > 0.5 \end{cases}$$

MIN = 2 × L−MAX
CASE WHERE S = 0
  R = G = B = L
CASE OTHER THAN S = 0
  h = H + 120
  h = h − 360    h ≥ 360

$$R = \begin{cases} MIN + (MAX - MIN) \times h/60 & 0 \leq h < 60 \\ MAX & 60 \leq h < 180 \\ MIN + (MAX - MIN) \times (240 - h)/60 & 180 \leq h < 240 \\ MIN & 240 \leq h < 360 \end{cases}$$

h = H $$G = \begin{cases} MIN + (MAX - MIN) \times h/60 & 0 \leq h < 60 \\ MAX & 60 \leq h < 180 \\ MIN + (MAX - MIN) \times (240 - h)/60 & 180 \leq h < 240 \\ MIN & 240 \leq h < 360 \end{cases}$$

h = H − 120
h = h + 360    h < 0

$$B = \begin{cases} MIN + (MAX - MIN) \times h/60 & 0 \leq h < 60 \\ MAX & 60 \leq h < 180 \\ MIN + (MAX - MIN) \times (240 - h)/60 & 180 \leq h < 240 \\ MIN & 240 \leq h < 360 \end{cases}$$

MATHEMATICAL FORMULA (1)

■ sRGB → XYZ $\gamma = 2.2$

R' = (R/255)$^\gamma$

G' = (G/255)$^\gamma$

B' = (B/255)$^\gamma$

X = 0.4124*R' + 0.3576*G' + 0.1805*B'

Y = 0.2126*R' + 0.7152*G' + 0.0722*B'

Z = 0.0193*R' + 0.1192*G' + 0.9505*B'

MATHEMATICAL FORMULA (2)

COLOR GAMUT MAPPING BY FORMING CURVED CROSS-SECTIONAL SURFACES

BACKGROUND OF THE INVENTION

1. Field of the Invention

The present invention generally relates to an image processing apparatus, an image processing method, and a computer-readable recording medium storing an image processing program in which a color profile to be required is formed when an arbitrary color image signal is converted into a color of a color image outputting apparatus or a virtual device whose gamut is restricted to a certain degree. The present invention is suitably used in a color displaying device such as a color liquid crystal device, color image forming apparatuses such as a color facsimile machine, a color printer, and a color copying apparatus, and color printer software for a personal computer and a workstation.

2. Description of the Related Art

Patent Documents 1 and 2 disclose a technology for forming a color profile. In Patent Document 1, plural color profiles have been prepared beforehand, a user selects a desirable color profile based on, for example, the age and residential area of the user, processes an image by using the selected color profile, corrects again the processed image by using his/her own preference, and a desirable print image is obtained. In Patent Document 2, a desirable color reproduction for a user is obtained by reflecting a color reproduction tendency based on an impression to be given to human eyes, based on a subjective evaluation result with the use of a color patch.

[Patent Document 1] Japanese Unexamined Patent Publication No. 2004-234251
[Patent Document 2] Japanese Unexamined Patent Publication No. H10-290375

However, as described above, in Patent Document 1, the user preference is selected by using the age and the residential area of the user. For example, in a blue color (sRGB(R, G, B)=(0, 0, 256)), the hue of the blue color may be near cyan or magenta, and the luminance of the blue color may be light or dark. That is, the preferences of users are different from each other, and even if a manufacturer supplies color profiles to the users, the color profiles may not be suitable for each user.

In Patent Document 2, a color preference tendency has been made to be a model by using the color patches and the model is utilized to form the color profile. In the subjective evaluation by using the color patches, a desirable color can be specified. However, the preference of the gradation reproducibility cannot be obtained even if the specified color has a desirable hue.

When the user preference is to be reflected in a color profile, it is desirable that the user preference be included in the color profile when the color profile is formed. However, in a gamut mapping technology for forming the color profile, much know-how exists in color output quality, for example, in reproduction of a smooth gradation of an image while utilizing efficiency of the color image forming apparatus. Consequently, it is difficult for a user who is not an expert of the gamut mapping technology to easily form a color profile in which the user preference is reflected with high quality.

SUMMARY OF THE INVENTION

In a preferred embodiment of the present invention, there is provided an image processing apparatus, an image processing method, and a computer-readable recording medium storing an image processing program in which a user can form a high-quality color profile by reflecting a preference of the user in the color profile even if the user is not an expert in the gamut mapping technology.

Features and advantages of the present invention are set forth in the description that follows, and in part will become apparent from the description and the accompanying drawings, or may be learned by practice of the invention according to the teachings provided in the description. Features and advantages of the present invention will be realized and attained by an image processing apparatus, an image processing method, and a computer-readable recording medium storing an image processing program particularly pointed out in the specification in such full, clear, concise, and exact terms so as to enable a person having ordinary skill in the art to practice the invention.

To achieve one or more of these and other advantages, according to one aspect of the present invention, there is provided an image processing apparatus which performs mapping of a color signal of a first gamut to a color signal of a second gamut on a device-independent color space. The image processing apparatus includes a first forming unit which forms a table for determining a correspondence relationship between the color signal of the first gamut and the color signal of the second gamut, a second forming unit which forms a cross-sectional surface of the second gamut, a mapping unit which performs mapping of the color signal of the first gamut on the cross-sectional surface of the second gamut in each predetermined hue by referring to the table, a conversion unit which converts the color signal on the cross-sectional surface of the second gamut into an output device-dependent color signal, and an LUT (lookup table) forming unit which forms plural LUTs corresponding to kinds of the tables and kinds of the cross-sectional surfaces as the LUTs for converting a device-dependent color signal corresponding to the color signal of the first gamut into the output device-dependent color signal.

BRIEF DESCRIPTION OF THE DRAWINGS

Features and advantages of the present invention will become more apparent from the following detailed description when read in conjunction with the accompanying drawings, in which:

FIG. 2A is a diagram showing a RGB color space;

FIG. 2B is a diagram showing an HLS color space;

FIG. 19 is a diagram showing a mathematical formula which converts signals between RGB and HLS; and FIG. 20 is a diagram showing another mathematical formula which converts sRGB signals into XYZ signals.

DESCRIPTION OF THE PREFERRED EMBODIMENTS

Best Mode of Carrying Out the Invention

The best mode of carrying out the present invention is described with reference to the accompanying drawings.

First Embodiment

Figure 1A:
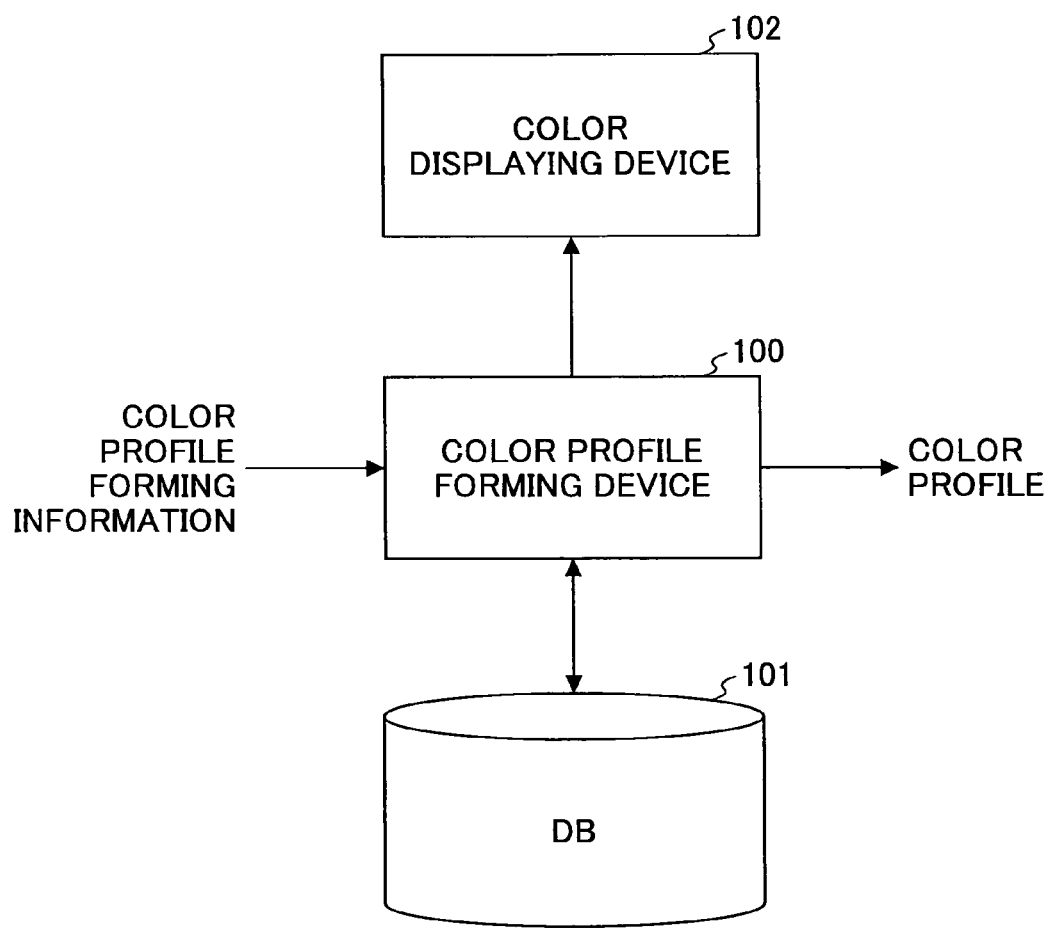
FIG. 1A is a block diagram showing an image processing apparatus according to a first embodiment of the present invention.

FIG. 1A is a block diagram showing an image processing apparatus according to a first embodiment of the present invention. As shown in FIG. 1A, the image processing apparatus includes a color profile forming device 100, a database (DB) 101, and a color displaying device 102. Color profile forming information such as a user preference color and a gamut mapping model is input to the color profile forming device 100 from input devices (not shown) such as a keyboard and a mouse. The color profile forming device 100 reads information from the DB 101 or records information in the DB 101, and further, sends an image and information to the color displaying device 102.

Figure 1B:
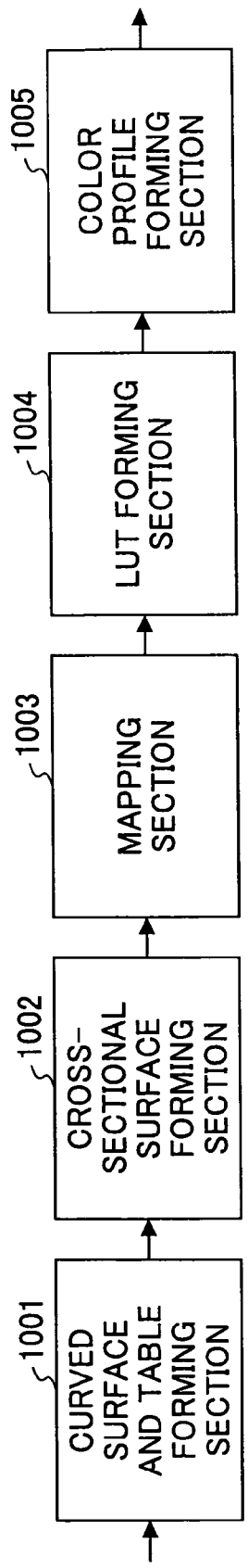
FIG. 1B is a block diagram showing a color profile forming device shown in FIG. 1A.

FIG. 1B is a block diagram showing the color profile forming device 100. As shown in FIG. 1B, the color profile forming device 100 includes a curved surface and table forming section 1001, a cross-sectional surface forming section 1002, a mapping section 1003, an LUT (lookup table) forming section 1004, and a color profile forming section 1005.

First, gamut mapping and a color profile are described. A general RGB signal which is used in a personal computer is an sRGB signal. FIG. 2A is a diagram showing a RGB color space. In FIG. 2A, for example, at a point Wp0 (white point), (R, G, B)=(255, 255, 255); at a point Bp0 (black point), (R, G, B)=(0, 0, 0); and at a point R0 (red point), (R, G, B)=(255, 0, 0). The RGB signal can be converted into an HLS signal in an HLS color space which is normally used in the graphics field. FIG. 2B is a diagram showing the HLS color space. In addition, an HLS signal can be converted into an RGB signal. The conversion can be performed by using Mathematical Formula (1) shown in FIG. 19.

Figure 3:
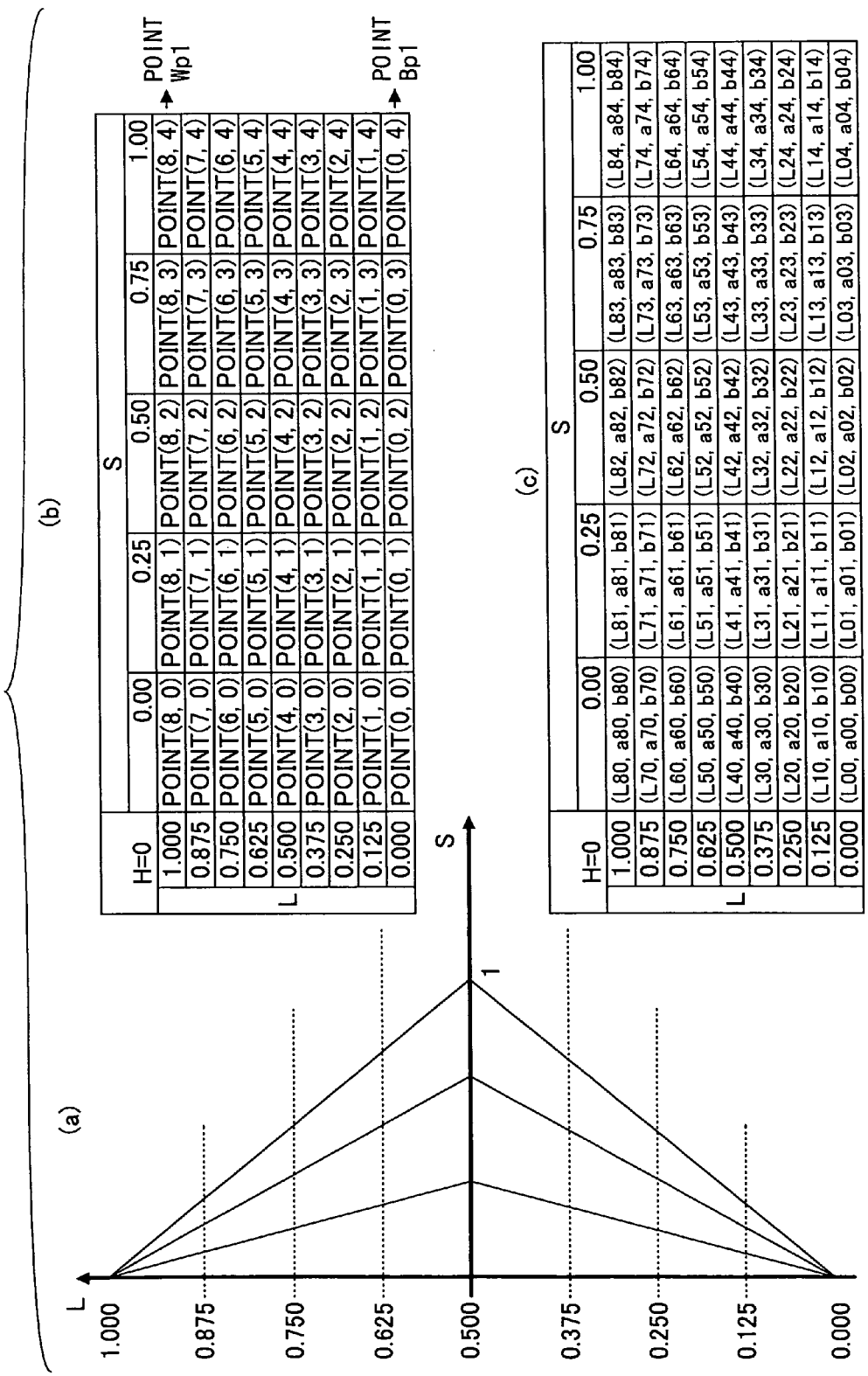
FIG. 3 is a diagram showing HLS lattice points.

The point Wp0, the point Bp0, and the point R0 in the RGB color space shown in FIG. 2A are converted into a point Wp1, a point Bp1, and a point R in the HLS color space shown in FIG. 2B, respectively. In the HLS color space shown in FIG. 2B, H shows a hue, L shows a luminance, and shows a (chroma) saturation. The HLS color space includes an L axis, and an HLS color space is shown in FIG. 3($a$) when a hue value H is determined to be "0". In FIG. 3($a$), as an example, a luminance axis L is divided into 8 portions and a saturation axis is divided into 4 portions on the same hue value surface (H=0).

All points obtained by dividing the axes L and are shown in FIG. 3($b$). In FIG. 3($b$), an L value "1" is the same in a point (8, 0) through a point (8, 4), and corresponds to the point Wp1 of FIG. 2B. In addition, an L value "0" is the same in a point (0, 0) through a point (0, 4), and corresponds to the point Bp1 of FIG. 2B. Hereinafter those points are described as HLS lattice points.

The points in the HLS color space shown in FIG. 3($b$) are converted into points in a CIELAB color space which is independent of devices, and become point group data (color signal group of L*a*b* values) shown in FIG. 3($c$). That is, FIG. 3 is a diagram showing the HLS lattice points.

When the signals in the RGB color space shown in FIG. 2A are converted into L*a*b* signals, the converted signals are shown in FIG. 4($a$). In FIG. 4($a$), as an example, the CIELAB color space which is independent of devices is used. However, a color space in which the gamut mapping is performed is not limited to the CIELAB color space. Recently, a CIECAM02 color space which is a color visible model has been used.

In any one of the color spaces, the input RGB signal (for example, an sRGB signal, or an Adobe RGB signal) is converted into a tristimulus value XYZ by Mathematical Formula (2) shown in FIG. 20. In FIG. 20, only conversion from an sRGB signal to an XYZ signal is shown and conversion from an XYZ signal to an sRGB signal is omitted. Further, since a conversion formula has been defined, for example, a value of the CIELAB color space can be converted into an L*a*b* value.

Figure 4B:
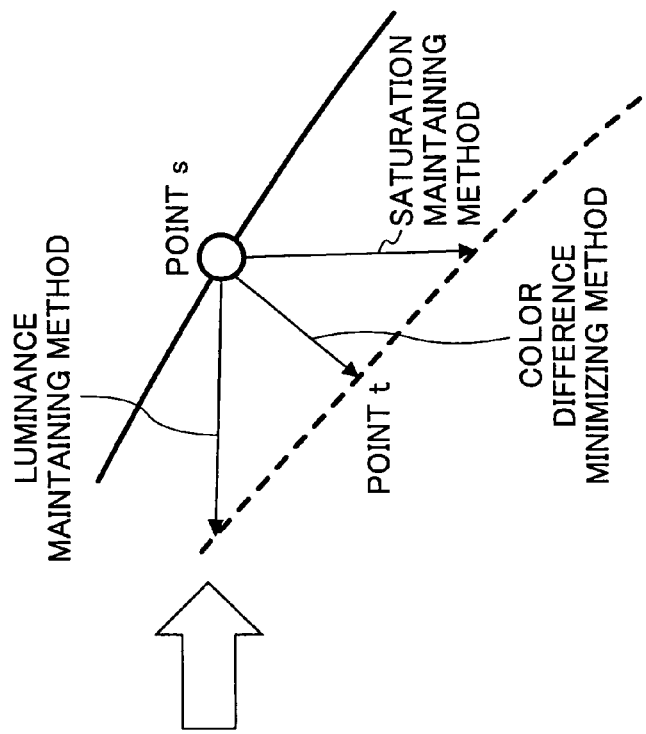
FIG. 4B is a diagram showing gamut mapping methods.
Figure 4A:
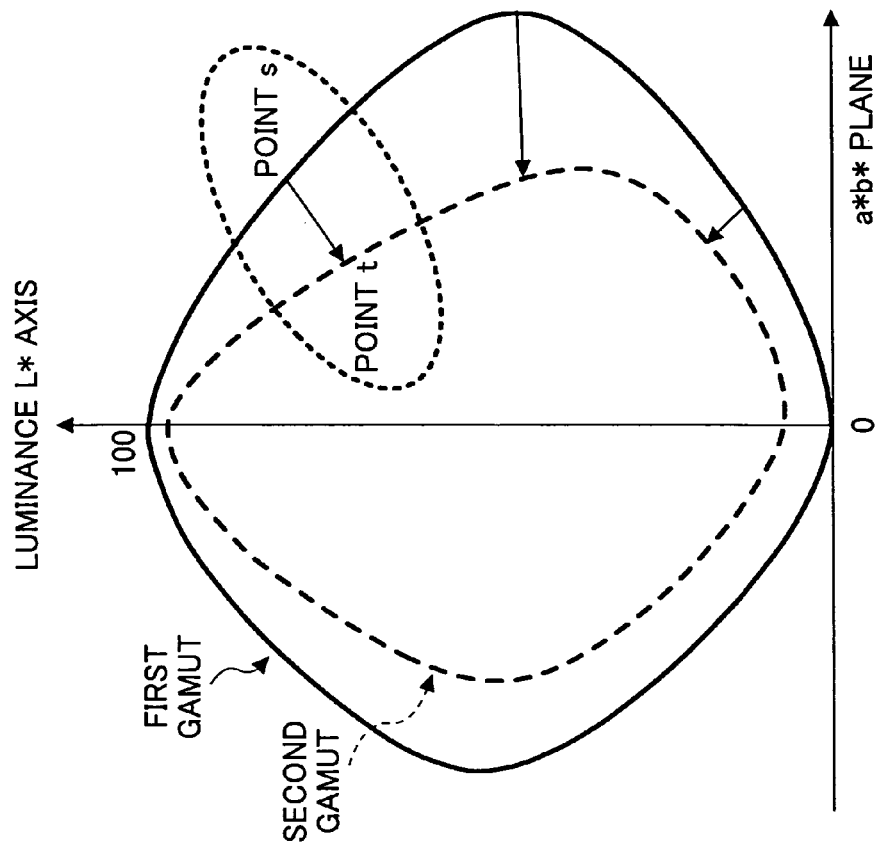
FIG. 4A is a diagram showing input and output gamuts in a CIELAB color space.

FIG. 4A is a diagram showing input and output gamuts in the CIELAB color space. In FIG. 4A, the CIELAB color space is viewed from the lateral direction and is shown by an a*b* plane and a luminance L* axis. In FIG. 4A, the continuous line shows an input gamut (first gamut) which is a color reproducible region (gamut) by a color displaying device (for example, a color liquid crystal display), and the broken line shows an output gamut (second gamut) which is a color reproducible region by a color image forming apparatus (for example, a color printer).

As shown in FIG. 4A, since the size of the first gamut is greater than the size of the second gamut, gamut mapping is performed so that a color "point s" of the first gamut corresponds to a color "point t" of the second gamut.

FIG. 4B is a diagram showing gamut mapping methods. As gamut mapping representative methods, as shown in FIG. 4B, there are a luminance maintaining method in which the gamut mapping is performed by maintaining the luminance L* on an equal hue surface; a saturation maintaining method in which the gamut mapping is performed by maintaining a distance from the luminance L* axis; that is, by maintaining the saturation; and a color difference minimizing method in which the gamut mapping is performed to an extent so that the distance from point "s" to the point "t" is a minimum value. In addition to the above methods, a method exists in which a shape difference between the first gamut and the second gamut is calculated and an angle of the mapping from the point "s" to the point "t" is variable from the luminance maintenance to the saturation maintenance.

Figure 5:
FIG. 5 is a diagram showing signal conversion in gamut mapping.

FIG. 5 is a diagram showing signal conversion in the gamut mapping. In the present embodiment, the hue H is divided into "I" divisions (for example, I=6, 12, 18, 24, ...) with a ΔH pitch around the L axis, by causing the starting point signal to be an HLS signal. When "I" is determined to be 6, an equal hue surface formed of a point R (red), a point Y (yellow), a point G (green), a point C (cyan), a point B (blue), and a point M (magenta) can be obtained from H=0 counterclockwise with a 60° pitch. As shown in each equal hue surface of FIG. 3, the luminance L is divided into J divisions (in FIG. 3, J=8), and the saturation is divided into K divisions (in FIG. 3, K=4). With this, HLS values of all the HLS lattice points are determined.

Next, the HLS value is converted into an RGB value, an XYZ value, and an L*a*b* value. As shown in FIGS. 4A and 4B, an L*'a*'b*' value is calculated by performing the gamut mapping for the L*a*b* value, and an X'Y'Z' value and a R'G'B' value can be obtained by reverse conversion. A 3D-LUT of three inputs and three outputs can be formed by using the former RGB values and the latter R'G'B' values.

In the present embodiment, the 3D-LUT is described as the color profile. In addition to the 3D-LUT, as the color profile, there are color profiles which convert an input RGB value into an output L*a*b* value, convert an input L*a*b* value into an output RGB value, and convert an input L*a*b* value into an output CMYK value. The conversion method is not limited to the method in the 3D-LUT, and can be a method using a conversion determinant.

In the gamut mapping, color reproducibility excellence is determined by a connection method of the point "s" to the point "t" in FIGS. 4A and 4B. Since the shapes of the first gamut and the second gamut are different, it is very difficult for a user to determine the connection method. In order to solve the above problem, since the sizes and the shapes of the first and second gamuts are known, many gamut mappings have been caused to be modeled beforehand, color profiles are formed by using the models, and images whose colors are converted have been prepared. The user selects an image whose color has been converted from the models, and forms a suitable color profile. With this, the user can form a high-quality color profile similar to a color profile formed by an expert.

Next, forming a gamut mapping model and forming an image corresponding to the gamut mapping model are described.

Figure 6:
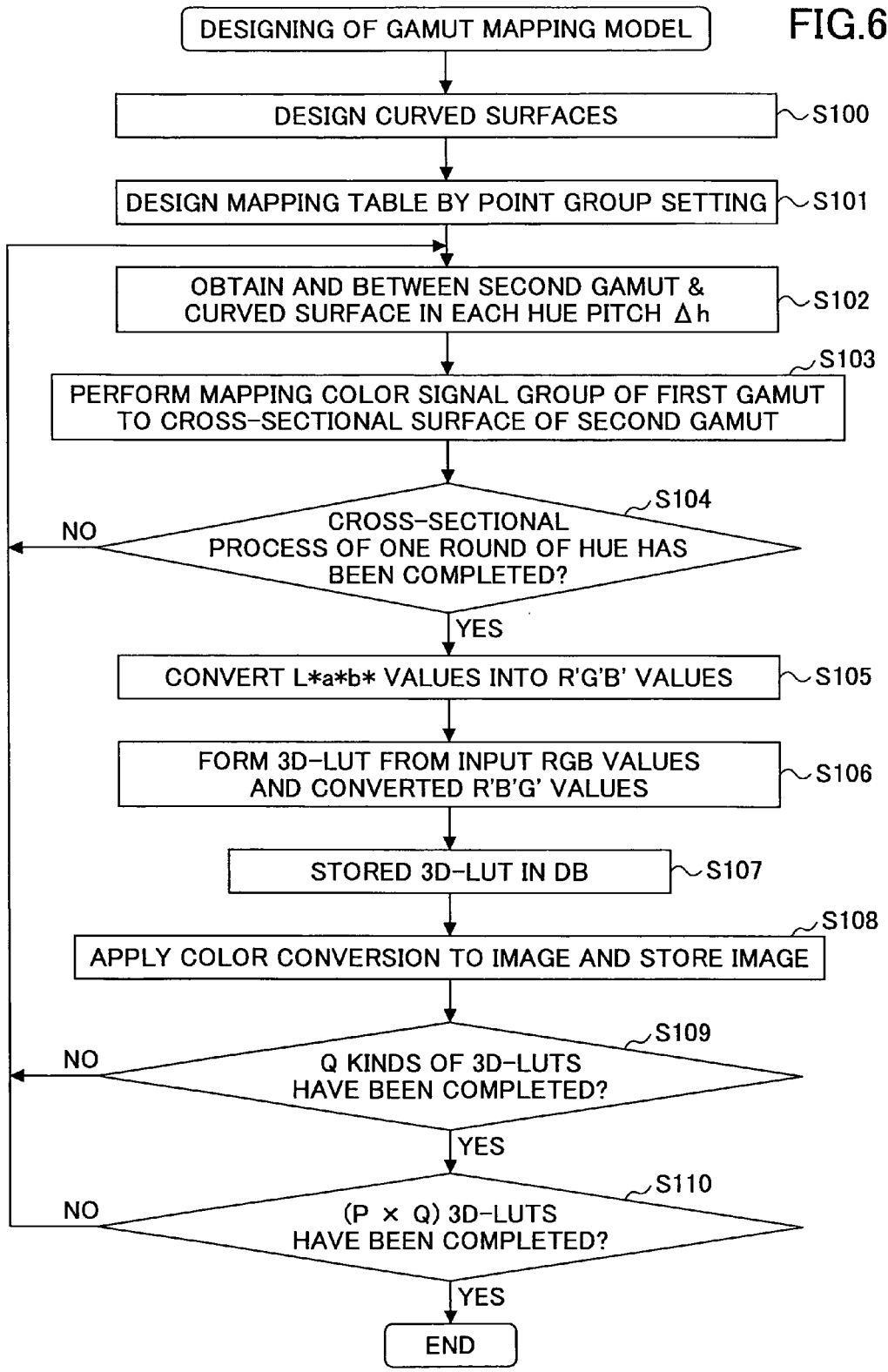
FIG. 6 is a flowchart showing processes to form a gamut mapping model.

FIG. 6 is a flowchart showing processes to form a gamut mapping model. The processes are performed by the color profile forming device 100 shown in FIG. 1A. That is, an image processing method is shown in FIG. 6.

Figure 7:
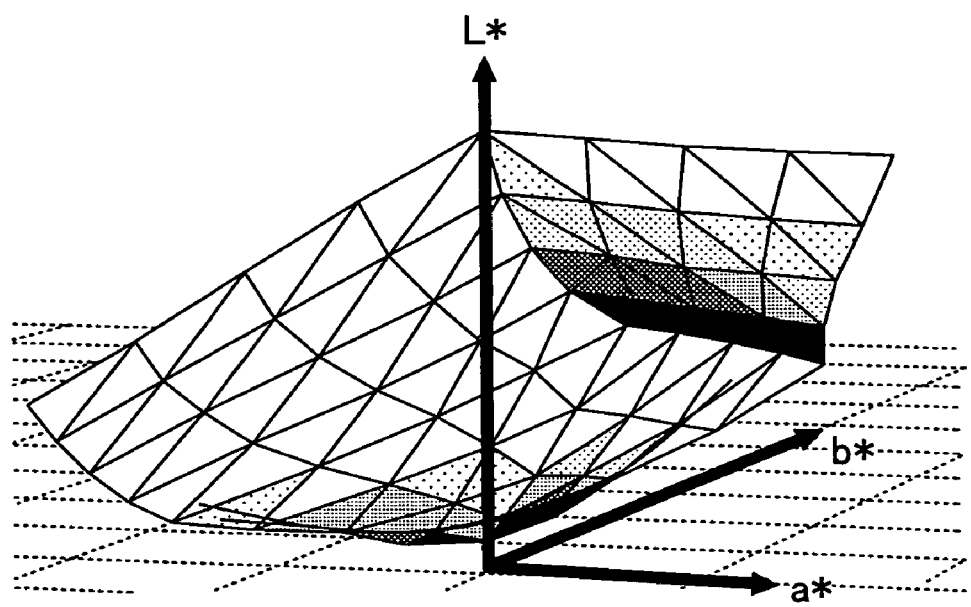
FIG. 7 is a diagram showing a solid model of a gamut surface.

First, the curved surface and table forming section 1001 designs curved surfaces (including planes) for cutting a solid model defined by a CIELAB color space of the second gamut (S100). The solid model has been stored in the DB 101 shown in FIG. 1A, and as shown in FIG. 7, in the solid model, the gamut surface of the solid model is a polygon (for example, a triangle, or a square). When AND between the solid model and the curved surface is obtained, a cross-sectional surface between the solid model and the curved surface can be formed. FIG. 7 is a diagram showing the solid model of the gamut surface.

Figure 8:
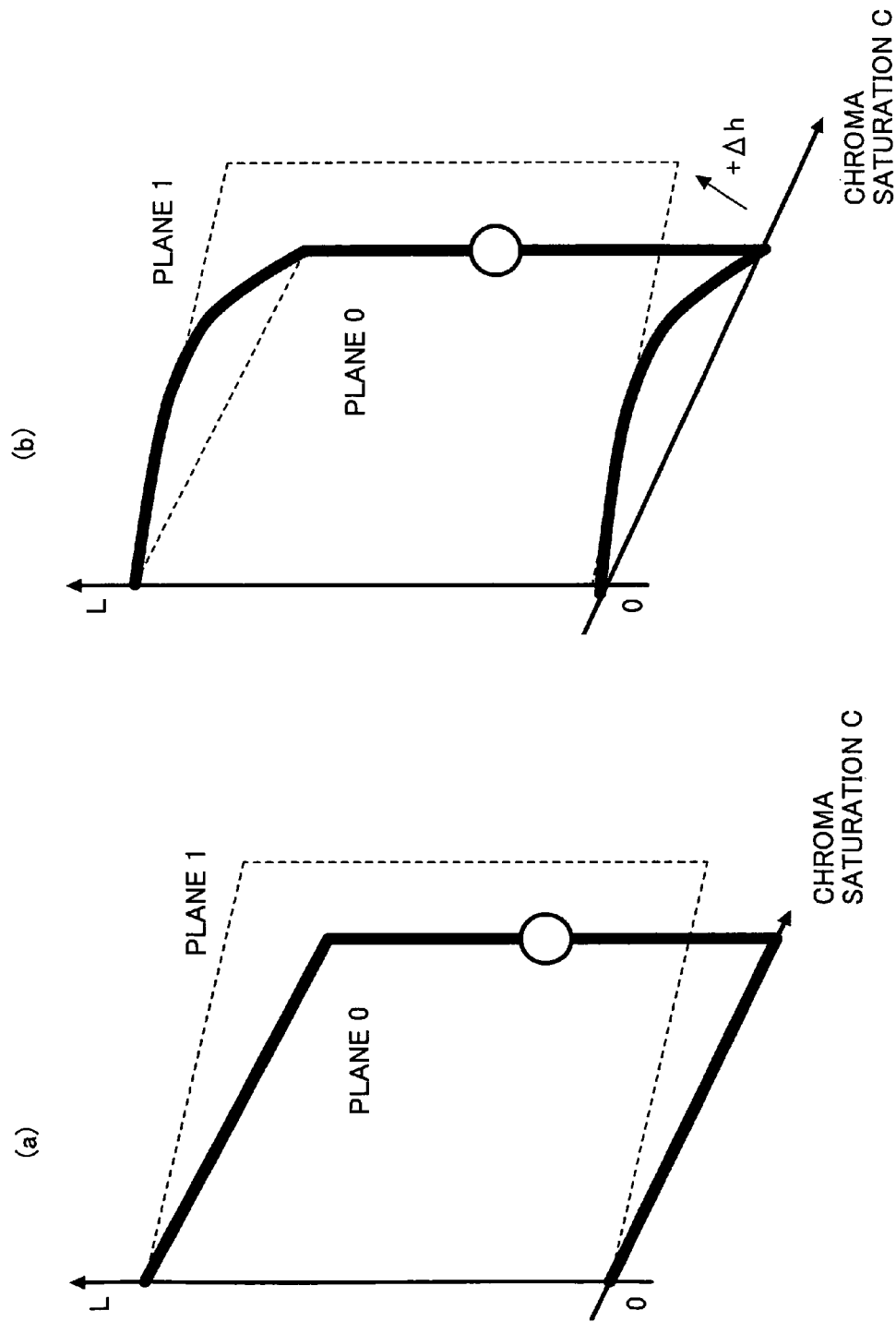
FIG. 8 is a diagram showing a curved surface including a luminance axis.

FIG. 8 is a diagram showing the curved surface (including planes) which includes the L axis. The curved surface (plane surface) includes the luminance L axis of the CIELAB color space and a chroma saturation C axis defined by Mathematical Formula (3).

$$C=\sqrt{(a^* \times a^* + b^* \times b^*)} \quad (3)$$

When the designed curved surface is rotated around the L axis, a solid model and an AND surface of an arbitrary hue can be formed.

In FIG. 8(a), a bold line shows a plane, and in FIG. 8(b), a bold line shows a curved surface. The curved surface shown in FIG. 8(b) is formed of a plane "0" in FIG. 8(a) and a plane "1" whose hue H is shifted by +Δh counterclockwise, and has a shape which includes the axis L and the plane "0" at the beginning and is gradually separated from the plane "0" and reaches the plane "1". In FIGS. 8(a) and 8(b), "○" shows a hue of the corresponding plane and curved surface. P kinds of the curved surfaces (plane surfaces) including the L axis have been stored in the DB 101 by being designed beforehand.

Figure 9:
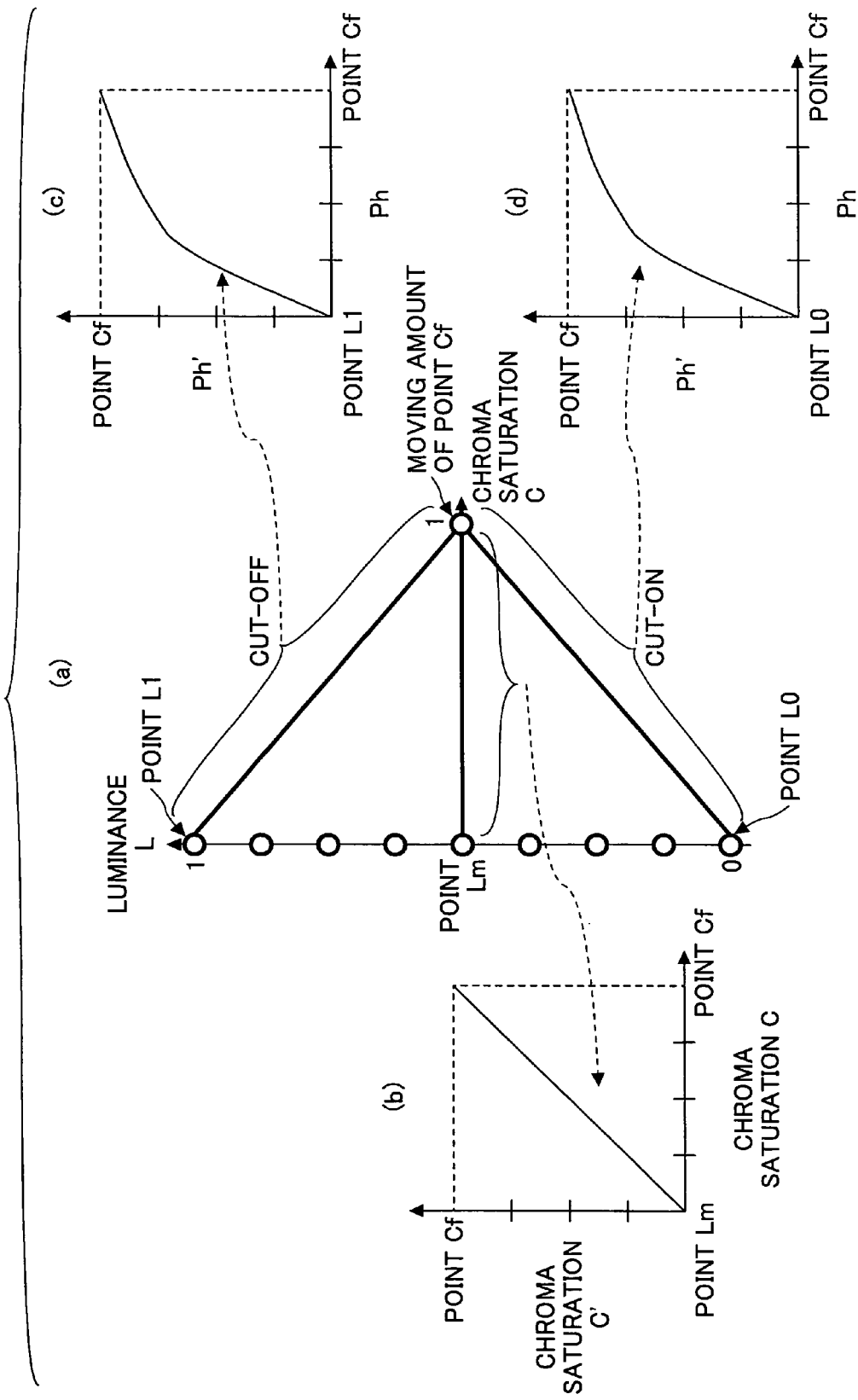
FIG. 9 is a diagram showing designing of mapping tables.

Next, the curved surface and table forming section 1001 designs a mapping table by a point group setting. Referring to FIG. 9, designing of the mapping table is described. FIG. 9 is a diagram showing the designing of the mapping table.

FIG. 9(a) is a mapping table which is referred to by the mapping section 1003 when the mapping section 1003 performs a mapping of a color signal of the first gamut (color signal of HLS or L*a*b* having a hue shown in FIG. 3) to a cross-sectional surface of the second gamut. That is, in FIG. 9(a), a correspondence relationship between color signals of the first gamut and color signals of the second gamut has been set as a point group (color signal point group).

In FIG. 9(a), the vertical axis shows the luminance L and the horizontal axis shows the chroma saturation C, where the values are normalized to "1" in each axis. In FIG. 9(a), "o" shows a fixed point. In the luminance axis L, an L value=0 shows a point L0, an L value=1 shows a point L1, 9 points exist from the point L0 to the point L1 with equal intervals, and a point Lm exists at a middle position in the luminance axis L. In the chroma saturation axis C, a point Cf shows a maximum chroma saturation value.

FIGS. 9(b), 9(c), and 9(d) are graphs (tables) illustrating correspondence relationships between the divided points of the first gamut and the divided points of the second gamut. The horizontal axis shows the divided points of the first gamut and the vertical axis shows the divided points of the second gamut. The dividing method between the point Lm and the point Cf is shown in FIG. 9(b). In FIG. 9(b), an example of four divisions is shown. In this example, since the characteristics between the first gamut and the second gamut are linear, the distance between the point Lm and the point Cf is equally divided into four divisions in the first gamut and the second gamut.

The dividing method between the point L1 and the point Cf is shown in FIG. 9(c) (without cutting between the point L1 and the point Cf). The dividing method between the point L0 and the point Cf is shown in FIG. 9(d) (with cutting between the point L0 and the point Cf). In FIGS. 9(c) and 9(d), examples of four divisions are shown. In these examples, since the characteristics between the first gamut and the second gamut are curved in the upward direction, mapping is performed at a position near the point Cf in the second gamut. In FIG. 9(a), a line from the point L1 to the point Cf, and a line from the point L0 to the point Cf are linear, and actually, correspond to a distance on the most outer line of the cross-sectional surface of the first gamut. In addition, a moving amount of the point Cf, and a selection of cut-on or cut-off of the cross-sectional surface of the gamut are set in the table.

The most outer line of the gamut, the moving amount of the Cf point, and the cut of the cross-sectional surface of the gamut are described below in detail.

Next, the cross-sectional surface forming section 1002 obtains AND between the second gamut and the designed curved surface in each hue pitch Ah (S102). The cross-sectional surface forming section 1002 obtains AND between the second gamut and the curved surface designed in S100 with the hue Ah pitch around the L axis of the second gamut in the counterclockwise direction and forms the cross-sectional surface. For example, when the Δh=30°, 12 cross-sectional surfaces are formed. When the Ah is small, the number of the cross-sectional surfaces is increased; however, the number of choices for selecting a desirable hue by a user is increased.

Figure 10:
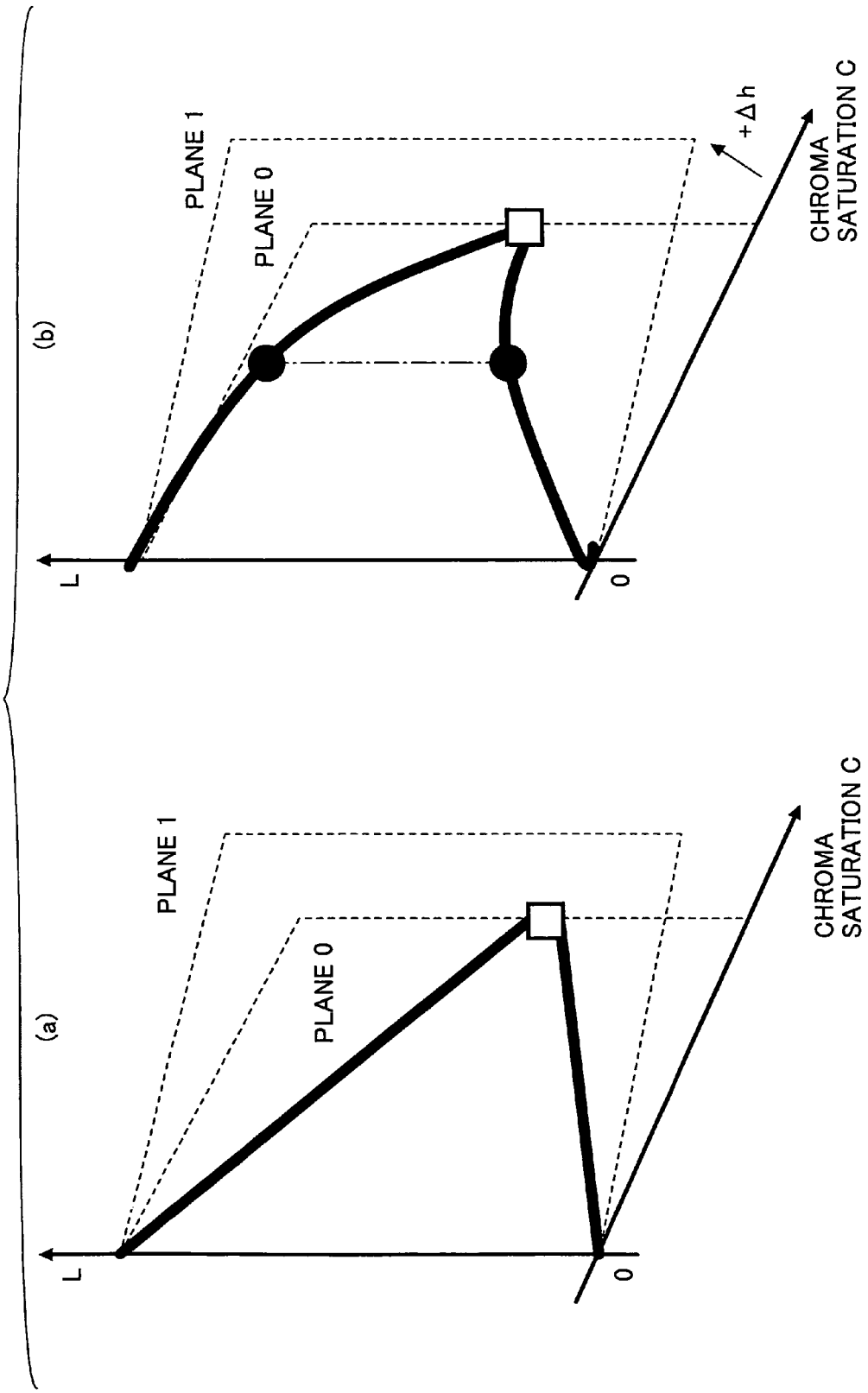
FIG. 10 is diagram showing examples of cross-sectional surfaces of a gamut.

FIG. 10 is diagram showing examples of the cross-sectional surfaces. In FIG. 10(a), a cross-sectional surface is shown in which AND between the solid model in FIG. 7 with the H=0 and the plane "0" in FIG. 8(a) is obtained. In FIG. 10(b), a cross-sectional surface is shown in which AND between the solid model in FIG. 7 with the H=0 and the curved surface in FIG. 8(b) is obtained. In FIG. 10, "□" is a maximum chroma saturation point in the cross-sectional surface.

Next, the mapping section 1003 performs mapping of the color signal group of the first gamut to the cross-sectional surface of the second gamut by referring to a mapping table of the designed point group (color signal group) (S103).

In FIG. 11(a), an example is shown in which the color signal group (an HLS value or an L*a*b* value in H=60°) of the first gamut is mapped to a cross-sectional surface (broken line) between the second gamut (FIG. 7) and the plane of FIG. 8(a), by referring to the mapping table in which the point group of FIG. 9 is set.

Figure 11:
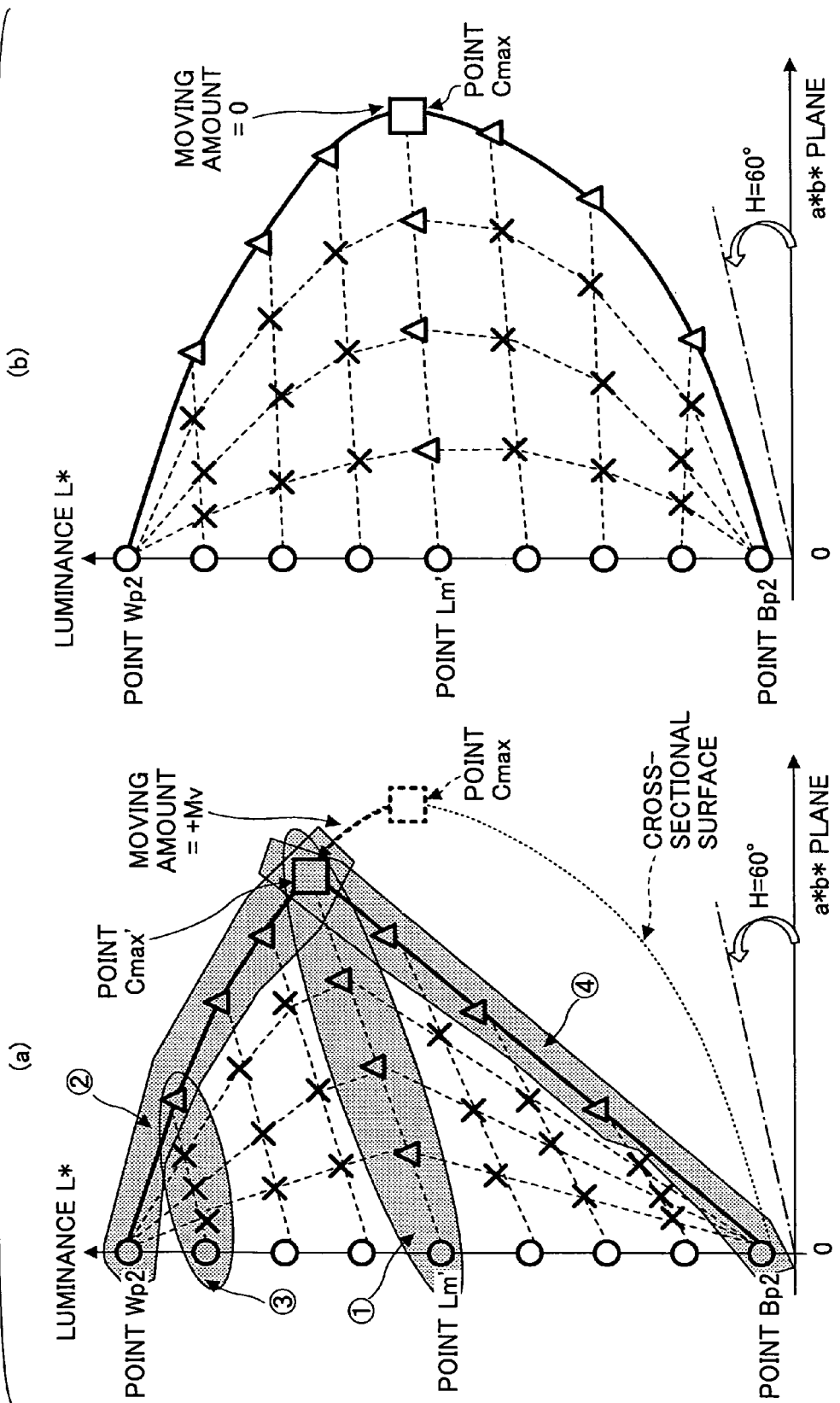
FIG. 11 is a diagram showing an example in which mapping of a color signal group of the first gamut is performed on a cross-sectional surface of the second gamut.

In FIG. 11, a curved line from a point Wp2 to a point Bp2 via a point Cmax' and a point Cmax (maximum chroma saturation point) is a most outer line of the gamut. In addition, luminance range points of Bp2 and Wp2 of the second gamut exist on the luminance axis L* of the CIELAB color space. The point Wp2 corresponds to the point Wp1 of the HLS color space of FIG. 2B and the point L1 of the mapping table of FIG. 9, and the point Bp2 corresponds to the point Bp1 of the HLS color space of FIG. 2B and the point L0 of the mapping table of FIG. 9.

The luminance from the point Wp2 to the point Bp2 is equally divided into eight divisions, and a point Lm' of FIG. 11 corresponds to the point Lm of FIG. 9. In addition, L*a*b* values at "o", "Δ", "x", and "□" in FIG. 11 correspond to values at corresponding points of the HLS color space of FIG. 3 at the hue=60°. For example, a point (4, 4) of the HLS color space corresponds to an L*a*b* value of the point Cmax of the CIELAB color space.

The "o" is a control point of the luminance axis (L* control point), the "Δ" is a framework control point of a cross-sectional surface (framework control point), the "x" is an interpolation point which is generated by connecting the L* control point with the framework control point.

Next, the forming of the "Δ" (framework control points) and the "x" (interpolation points) is described.

[Forming of a part of ① shown in FIG. 11(a)]

When the moving amount of the point Cf of FIG. 9(a) is +Mv, a point, which is moved by +Mv in the luminance positive direction from the point Cmax along the most outer line, is the point Cmax'. In the present embodiment, the movement of the point Cmax is described on the most outer line. Three framework control points "Δ" are determined by the point Lm', the point Cmax', and the divided points of the vertical axis of FIG. 9(b).

The moving amount is described. A color printer generally provides color materials (primary colors) of C (cyan), M (magenta), Y (yellow), and K (key color=black), and realizes a full-color image by changing the amounts of the primary colors.

In the following, RGB data of "C" is defined to be (R, G, B)=(0, 255, 255), and "C" is realized by the color printer.

(1): A solid image of (C, M, Y, K)=(255, 0, 0, 0) is secured. That is, the chroma saturation is emphasized.

(2): the size of the C data of (1) is caused to be small. That is, the data is caused to be data to be reproduced by a monitor.

The moving amount of FIG. 11(a) is a parameter to realize the above (1) and (2). That is, when the moving amount is "0" at the point Cmax, the above (1) is realized; and when the point Cmax is moved to the point Cmax' in the direction in which the luminance L* becomes large by causing the moving amount to be +Mv, the above (2) is realized.

[Forming of a part of ② shown in FIG. 11(a)]

Since a cut-off is designated, three framework control points "Δ" on the most outer line are determined by the point Wp2, the point Cmax', and the divided points of the vertical axis of FIG. 9(c).

[Forming of a part of ③ shown in FIG. 11(a)]

Since a pair of the L* control point "O" and the framework control point "Δ" is determined, three interpolation points "x" are determined by being in compliance with the characteristics of the divided points of the vertical axis of FIG. 9(b).

[Forming of a part of ④ shown in FIG. 11(a)]

Generally, the framework control points "Δ" are determined by the point Bp2 and the point Cmax', and the divided points of the vertical axis of FIG. 9(d); however, since a cut-on is designated, the point Bp2 to the point Cmax' is connected by a straight line, and three framework control points "Δ" are determined on the straight line corresponding to the divided points of the vertical axis of FIG. 9(d) instead of on the most outer line. The interpolation points "x" between the corresponding L* control points "O" and the framework control points "Δ" are determined by the same method as that of the part of ③.

Next, the cut-on and the cut-off in FIG. 9(a) are described. When the point Cmax is moved to the Cmax' described in the part of ②, the C (cyan) on the display is reproduced as a light color which reproduces a value at the point Cmax' that is not a C solid image in a color printer.

Therefore, when a gradation from a paper white image to a C solid image to a black image is printed, the C solid image appears in the middle of the gradation of the image between the paper white image and the black image. When reproduction of the above gradation is not desired, as shown in the part of ④ of FIG. 11(a) which connects the point Cmax' with the point Bp2, the output gamut is cut on. With this, the above gradation is avoided.

FIG. 11(b) is a mapping example when a mapping table is used in which the moving amount of the point Cf is "0", a cut-off exists between the point L1 and the point Cf, and a cut-on exists between the point L0 and the point Cf shown in FIG. 9.

Figure 12:
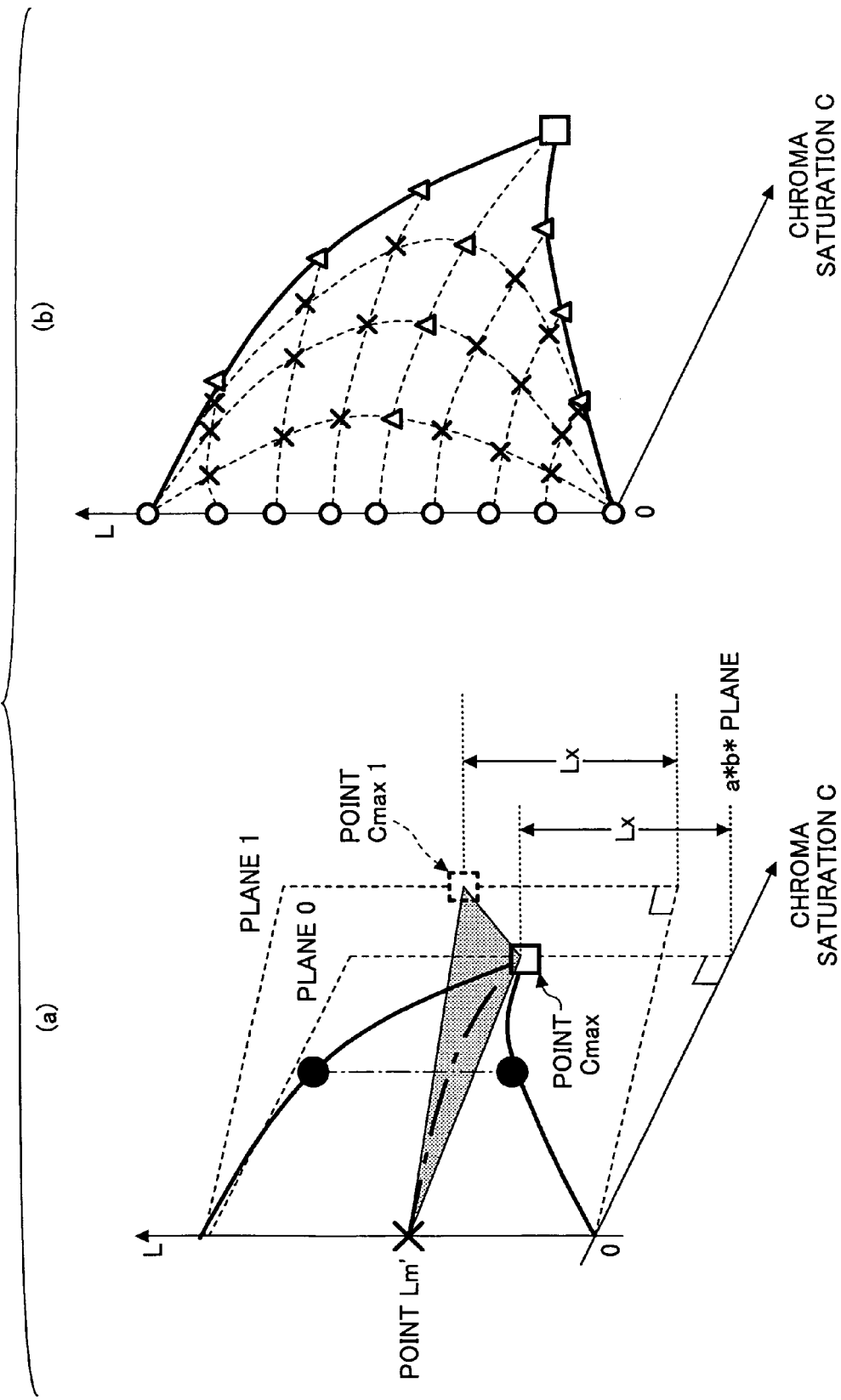
FIG. 12 is a diagram showing a process example when the cross-sectional surface is a curved surface.

Next, a processing example is described when the cross-sectional surface is a curved surface shown in FIG. 11(b). The point Cmax is determined to move on the most outer line similar to the case of the plane surface. The curved surface of FIG. 10(b) is obtained in the process of S102. In FIG. 12(a), a point Lm' on the L axis corresponds to the point Cmax, and a point Cmax 1 whose luminance Lx is on a plane 1 is determined by a vertical line from the point Cmax on the plane "0" to an a*b* plane. By dividing a curved surface with a plane containing the three points Lm', Cmax, and Cmax 1, and a curved line on the curved surface can be obtained.

FIG. 12(b) is a diagram showing a mapping example in which the L* control points "○", the framework control points "Δ", and the interpolation points "x" shown in FIG. 11 are mapped on the curved surface of FIG. 12(a).

Returning to FIG. 6, the cross-sectional surface forming section 1002 and the mapping section 1003 perform the processes in S102 and S103 by one round of the hue (S104). Hue at "○" on the plane "0" of the designed curved surface (FIG. 8) is rotated to a predetermined hue around the axis L and AND is obtained with the second gamut. The LUT forming section 1004 converts all the L*a*b* values of the generated points (FIG. 11) into R'G'B' values (S105), and forms a 3D-LUT from the input RGB values and the converted R'G'B' values (S106).

In the 3D-LUT, the converted R'G'B' values are stored in corresponding vertexes of small cubes formed by dividing the RGB cube shown in FIG. 2A, and an interpolation calculation is performed by using the eight vertexes of the small cube. The interpolation calculation can be performed by using six vertexes or four vertexes of the small cube.

Even if an HLS lattice point set by the HLS color space of FIG. 3 is converted into a lattice point of the RGB color space, the converted lattice point is not equal to a cubic lattice point formed by dividing the RGB color space of FIG. 2A. However, the HLS color space of FIG. 2B can be converted into the RGB color space of FIG. 2A. Therefore, a desirable cubic lattice point of the RGB color space can be obtained by an interpolation calculation.

Next, the formed 3D-LUT is stored in the DB 101 (S107), color conversion is applied to an image to be displayed to a user by using the 3D-LUT, and an image to which performing gamut mapping is simulated is stored in the DB 101 (S108). In this, one color converted image is formed for one original image.

The processes from S102 through S108 are applied to Q kinds of mapping tables by the designed point group (S109). With this, the Q kinds of the 3D-LUTs and images whose colors are converted by the 3D-LUT tables are formed. Further, the processes from S102 through S109 are applied to P kinds of designed curved surfaces (S110). With this, the (P×Q) 3D-LUTs and images whose colors are converted by the (P×Q) 3D-LUTs are formed.

Next, the Q kinds of the mapping tables (3D-LUTs) are described. For example, in FIG. 9, four kinds of the mapping tables are designed.

That is, one mapping table is formed in which a point group is set by table conversion characteristics of FIG. 9(a) through 9(d), one mapping table is formed in which a point group is set by changing only the table conversion characteristics of FIG. 9(b) to non-linear characteristics, one mapping table is formed in which a point group is set by changing only the table conversion non-linear characteristics of FIG. 9(c) to linear characteristics, and one mapping table is formed in which a point group is set by changing only the table conversion non-linear characteristics of FIG. 9(d) to linear characteristics.

[Image Selection of User and Forming of Desirable Color Profile]

Figure 13B:
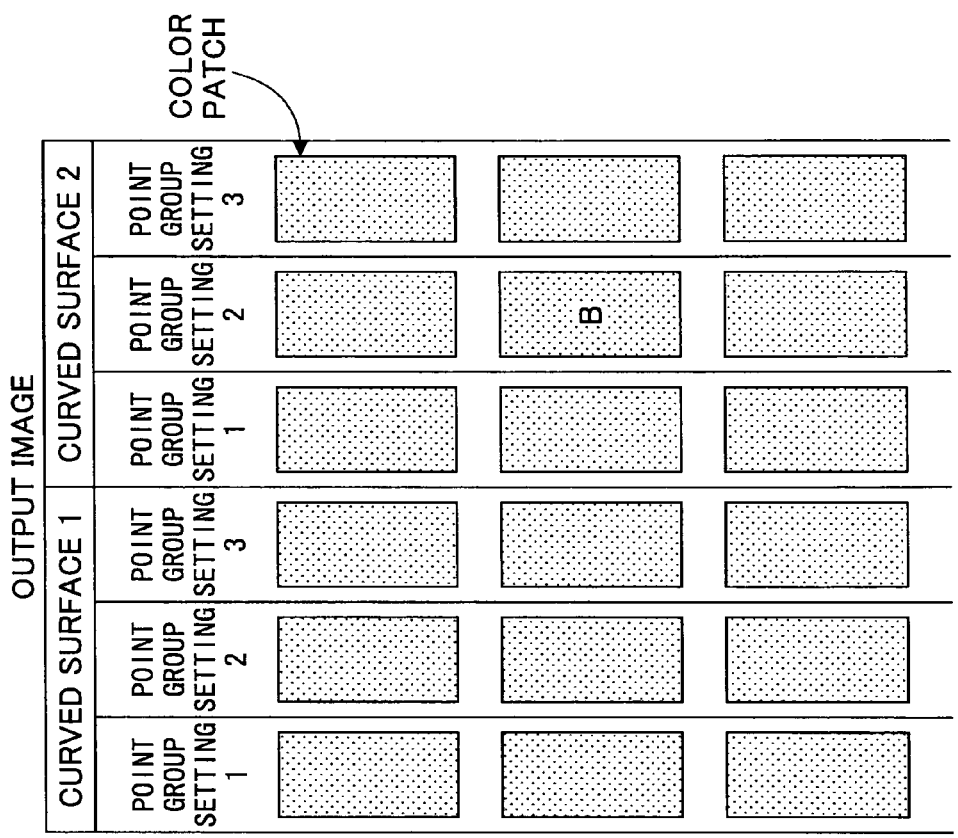
FIG. 13B is a diagram showing an output image in which the input image of FIG. 13A whose color has been converted by 3D-LUTs stored in a DB shown in FIG. 1A.
Figure 13A:
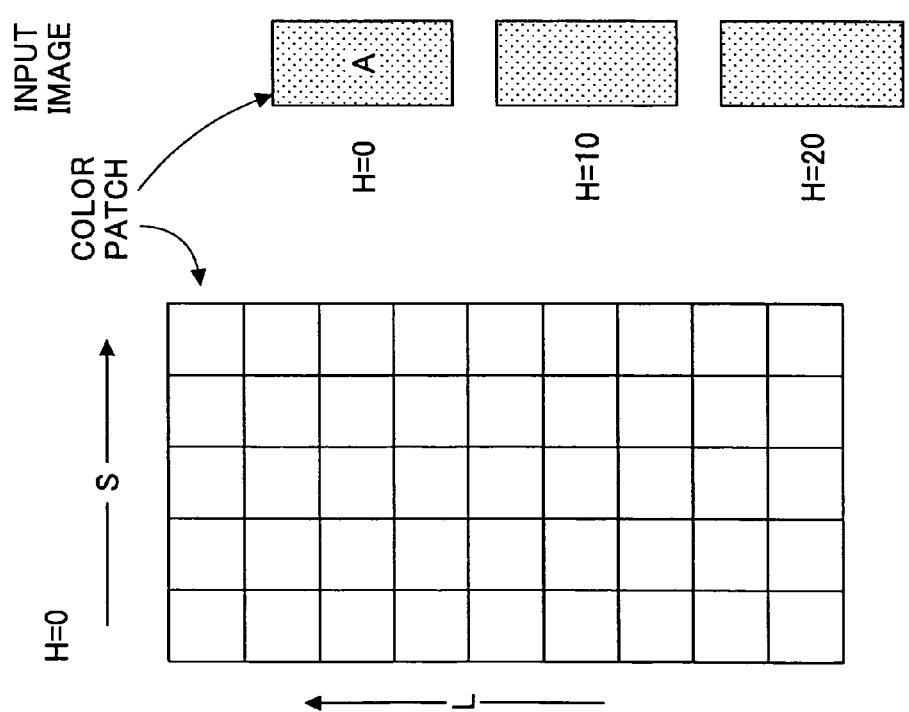
FIG. 13A is a diagram showing an input image to be displayed on a color displaying device shown in FIG. 1A.

FIG. 13A is a diagram showing an input image to be displayed on the color displaying device 102. The image is formed of color patches (color patch images) obtained by converting the HLS values of FIG. 3(b) into the RGB values in H=0.

FIG. 13B is a diagram showing an output image in which the input image of FIG. 13A whose colors have been converted by the 3D-LUTs stored in the DB 101. In FIG. 13B, the output image is displayed in each mapping table (point group setting) and each curved surface. The output image shown in FIG. 13B is an image in which the kinds of the curved surfaces are 2 (P=2) and the kinds of the mapping tables by the point group settings of 1 through 3 are 3 (Q=3). Therefore, the number of the 3D-LUTs (gamut mapping models) is 6 (P×Q=6).

In the example shown in FIGS. 13A and 13B, a user selects a desirable image by comparing an input image A of H=0 (color patch) with output images (color patches). In this example, the user selects an output image B in which the hue H=10, the curved surface is 2, and the mapping table is 2 (point group setting is 2).

In FIG. 13A, input images of H=0, H=10, and H=20 are shown. However, the input image is not limited to the examples shown in FIG. 13A, and can be, for example, a graphic art image having various colors or a photographic image using vivid colors. Further, the input image can be an image from which the user is likely to select a desirable hue or a desirable gradation. For example, corresponding to a hue, a background color near the hue can be selected in which the background color is determined to have a gradation from a black color to a red solid color since an image of H=0 is a red color.

Figure 14:
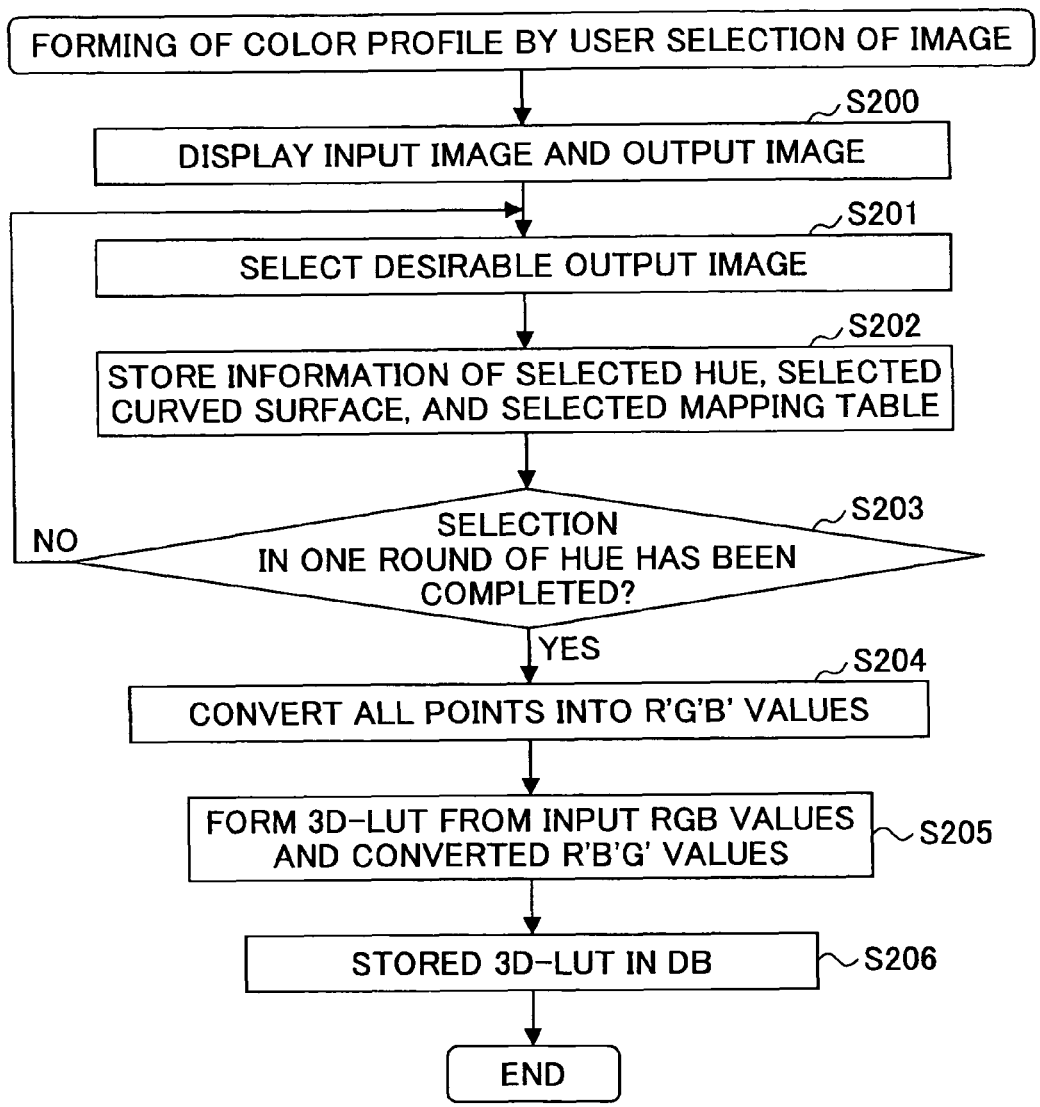
FIG. 14 is a flowchart showing processes to form a color profile based on a user selection of an image.

FIG. 14 is a flowchart showing processes to form a color profile based on a user selection of an image. The processes are performed by the color profile forming section 1005. That is, another image processing method is shown in FIG. 14.

First, an input image shown in FIG. 13A and output images shown in FIG. 13B are displayed on the color displaying device 102 (S200). Then a user selects an output image corresponding to a desirable hue H; a curved surface having a desirable luminance, a desirable chroma saturation, and a desirable gradation; and a mapping table (point group setting) based on a focused on input image having the desirable hue (S201).

Information of the selected hue H, the selected curved surface, and the selected mapping table is stored in the DB 101 (S202). The processes from S200 through S202 are performed in one round of the hue H (S203). When selection in one round of the hue has been completed (YES in S203), all points to form user desirable 3D-LUTs are determined and all the points are converted into R'G'B' values (S204). A process in S205 is the same as that in S106 shown in FIG. 6, and a process in S206 is the same as that in S107 shown in FIG. 6. With this, the user can form a desirable color profile by only selecting an output image corresponding to an input image.

In the above, a desirable color profile is obtained by selecting an output image corresponding to an input image. However, when a user needs to obtain a more desirable color profile, a new 3D-LUP can be stored in the DB 101 by performing the process in S100 of FIG. 6 (designing a curved surface) and the process in S101 of FIG. 6 (designing a point setting group).

Second Embodiment

Figure 15:
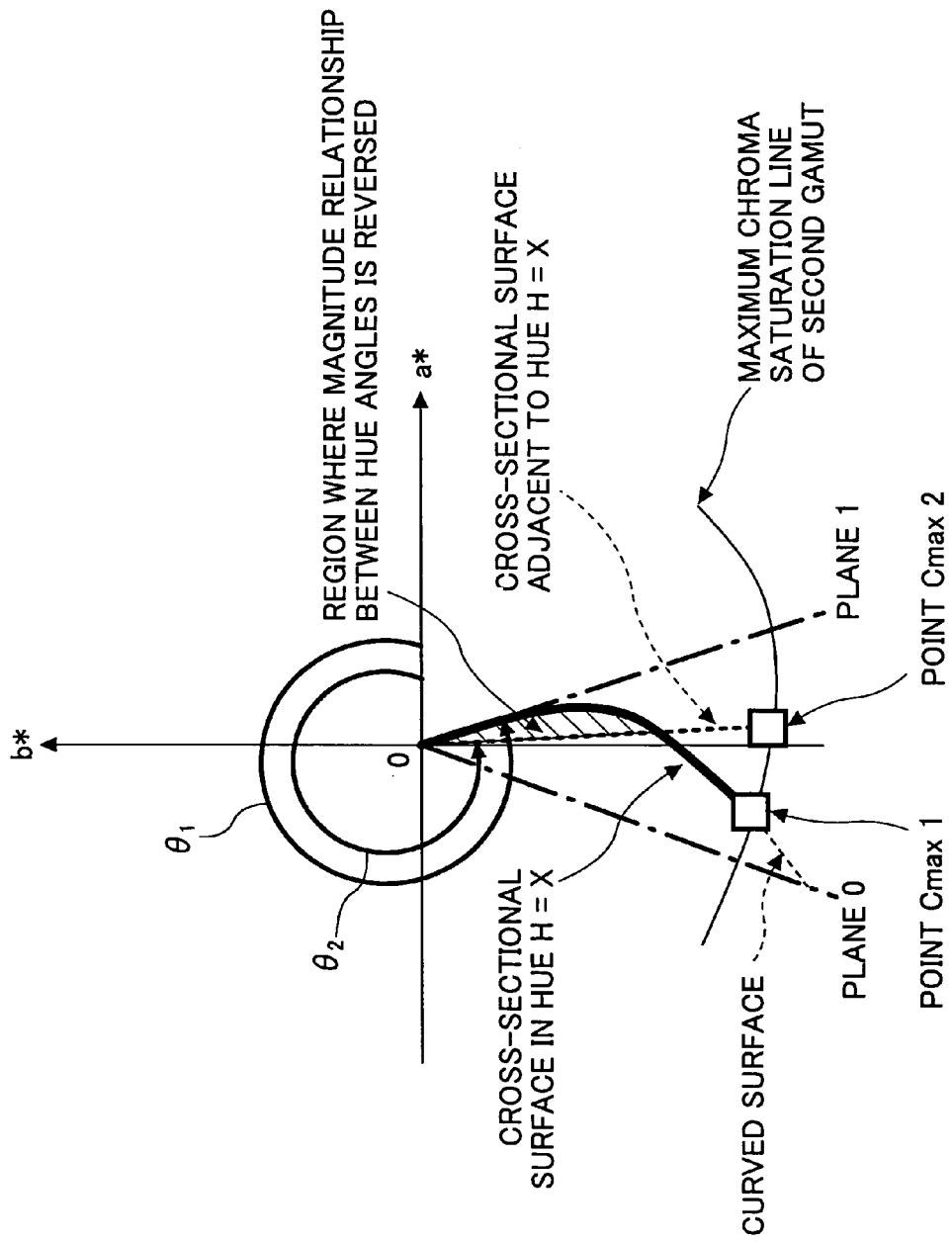
FIG. 15 is a diagram showing a state in which adjacent curved surfaces are overlapped.

When a user forms a color profile, since the color profile is formed based on a selection of an output image, adjacent curved surfaces may be overlapped. FIG. 15 is a diagram showing a state in which the adjacent curved surfaces are overlapped. In FIG. 15, an a*b* plane is shown in which a CIELAB color space is viewed from directly above.

Due to a curved surface generated by the plane 0 and the plane 1, a cross-sectional surface of the second gamut is shown as a bold line when the hue H=X. The cross-sectional surface includes a maximum chroma saturation point Cmax 1. A cross-sectional surface of a curved surface having a maximum chroma saturation point Cmax 2 adjacent to the hue H=X is shown as a broken bold line. A hatched part sandwiched between the cross-sectional surfaces is a hue overlapped part.

In the hue overlapped part, the magnitude relationship between hue angles is reversed. That is, the hue angle $\theta_1$ in the hue H=X becomes greater than the hue angle $\theta_2$ adjacent to the H=X (normally, $\theta_1 < \theta_2$). The hue overlapped part appears as a blurred part or a pseudo profile in the image. In the second embodiment of the present invention, the hue overlapped part is avoided.

Figure 16:
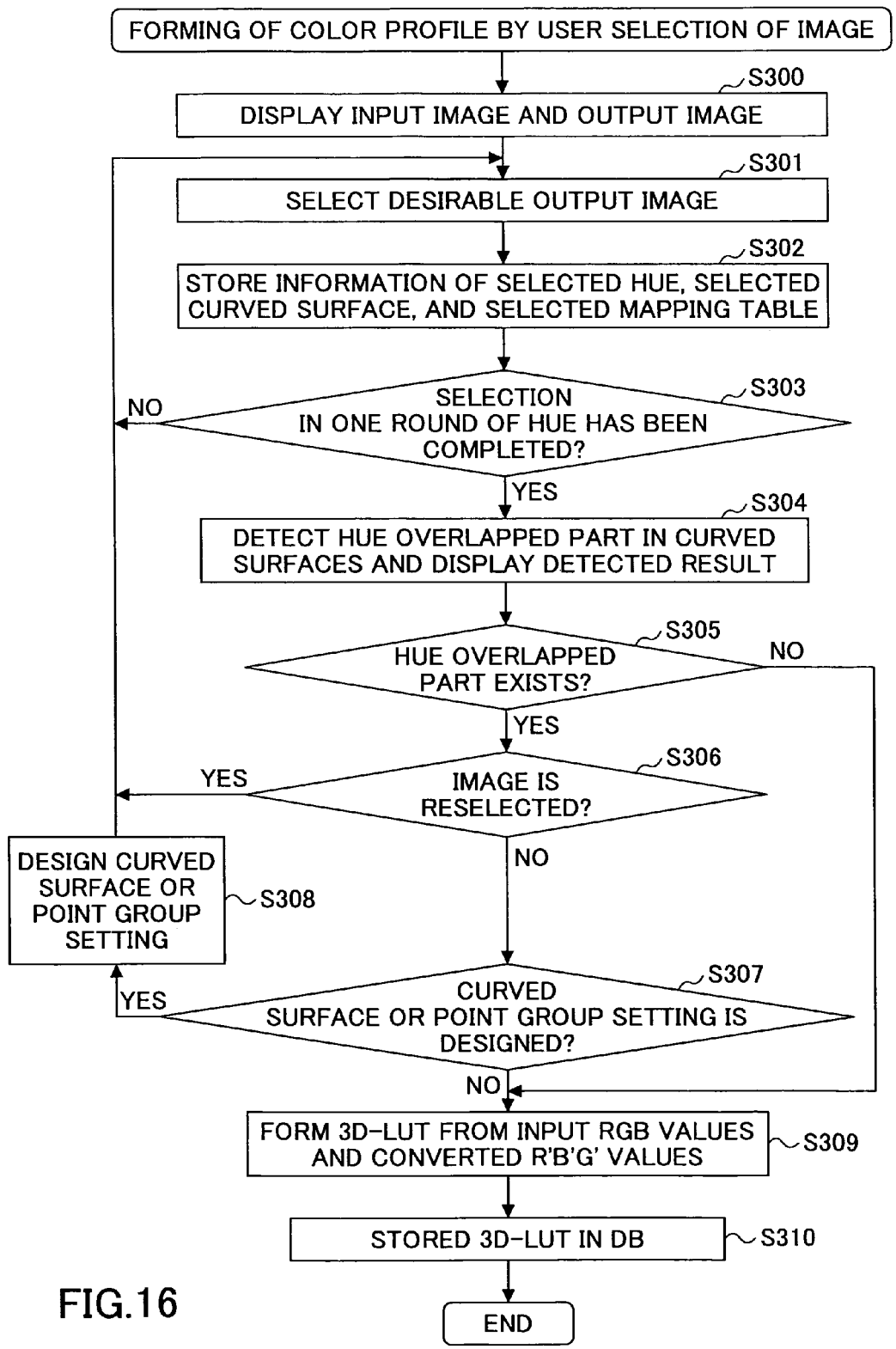
FIG. 16 is a flowchart showing processes according to a second embodiment of the present invention.

FIG. 16 is a flowchart showing processes according to the second embodiment of the present invention. That is, another image processing method is shown in FIG. 16. In FIG. 16, processes in S300, S301, S302, and S303 are the same as the processes in S200, S201, S202, and S203 in FIG. 14, respectively; further, processes in S309 and S310 are the same as the processes in S205 and S206 in FIG. 14, respectively. Therefore, processes different from those in FIG. 14 are described.

After the process in S303, a hue overlapped part in curved surfaces is detected and the detected result is displayed on the color displaying device 102 (S304). The hue overlapped part can be easily detected by calculating hues of all points in a point group formed on the curved surface and comparing the calculated hues with a hue on an adjacent curved surface. For example, a hue of a point in the hatched part on the curved surface including the point Cmax 1 is greater than a hue in a point on the curved surface including the point Cmax 2. When a hue overlapped part exists (YES in S305), an image is reselected (S306). When a hue overlapped part does not exist (NO in S305), the process goes to S309.

When an image is reselected (YES in S306), the process goes to S301. When an image is not reselected (NO in S306), a curved surface or a point group setting is designed (S307). When a curved surface or a point group setting is to be designed (YES in S307), the user designs the curved surface or the point group setting (S308). When a curved surface or a point group setting is not to be designed (NO in S307), a 3D-LUT is formed from the input RGB values and the converted R'G'B' values (S309).

Figure 17:
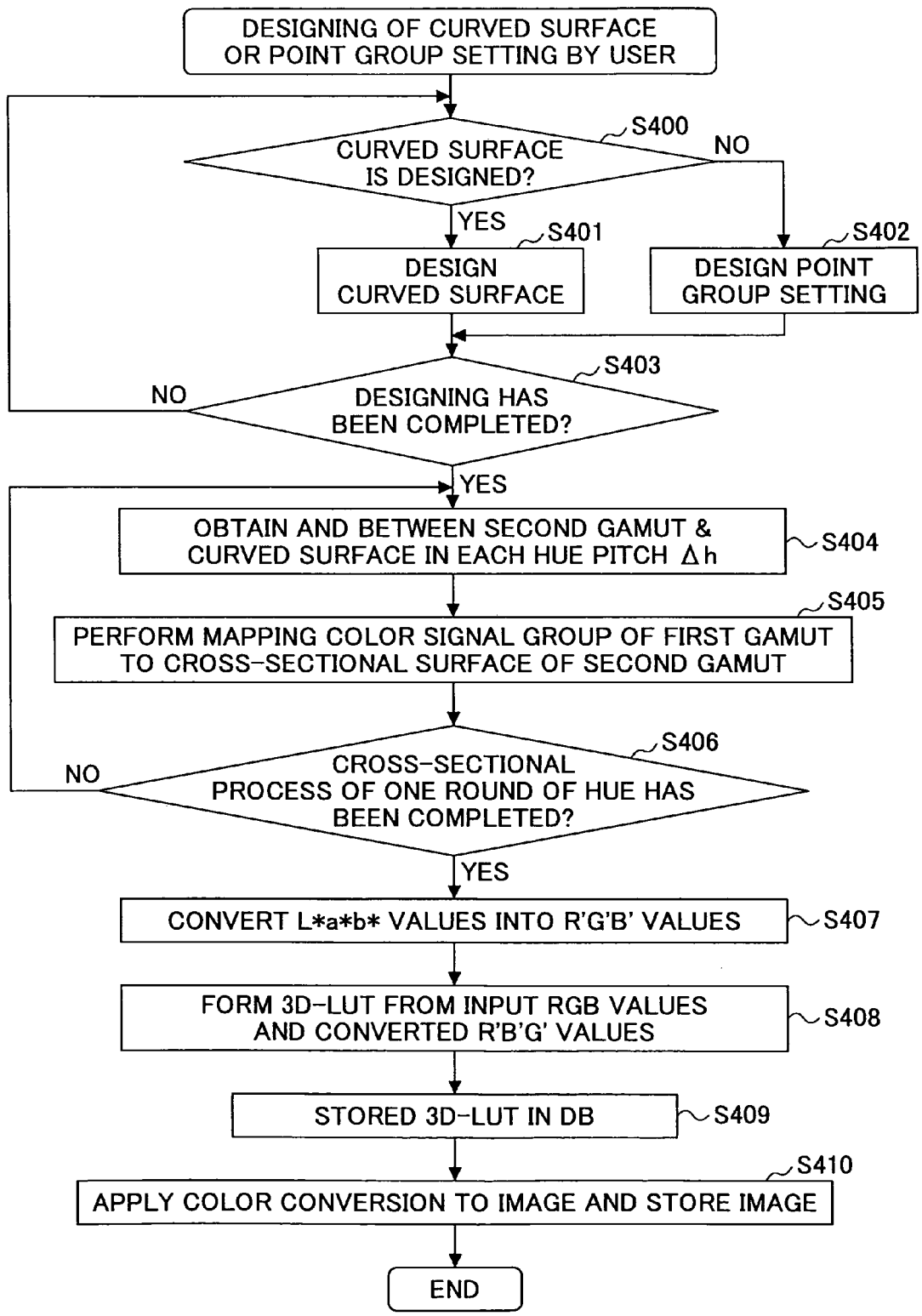
FIG. 17 is a flowchart showing processes in a process shown in FIG. 16 in which a user designs a curved surface or a point group setting.

FIG. 17 is a flowchart showing processes in S308 in which the user designs a curved surface or a point group setting. That is, another image processing method is shown in FIG. 17.

When a curved surface is to be designed (YES in S400), the user designs a curved surface (S401). When a curved surface is not to be designed (NO in S400), the user designs a point group setting (S402). When the curved surface or the point group setting has been designed (YES in S403, the process goes to S404.

In the designing of the curved surface, as shown in FIG. 8, a curved surface is formed by using plural plane surfaces, a hue "◯" of the curved surface is determined, and the curved surface is stored in the DB 101. In the designing of the point group setting, as shown in FIG. 9, characteristics for disposing a point group, a moving amount of a point Cf, cut-on or cut-off are designated for a curved surface model, and the designed point group setting is stored in the DB 101.

In FIG. 17, processes from S404 through S410 are the same as the processes from S102 through S108 in FIG. 6, respectively.

Third Embodiment

Figure 18:
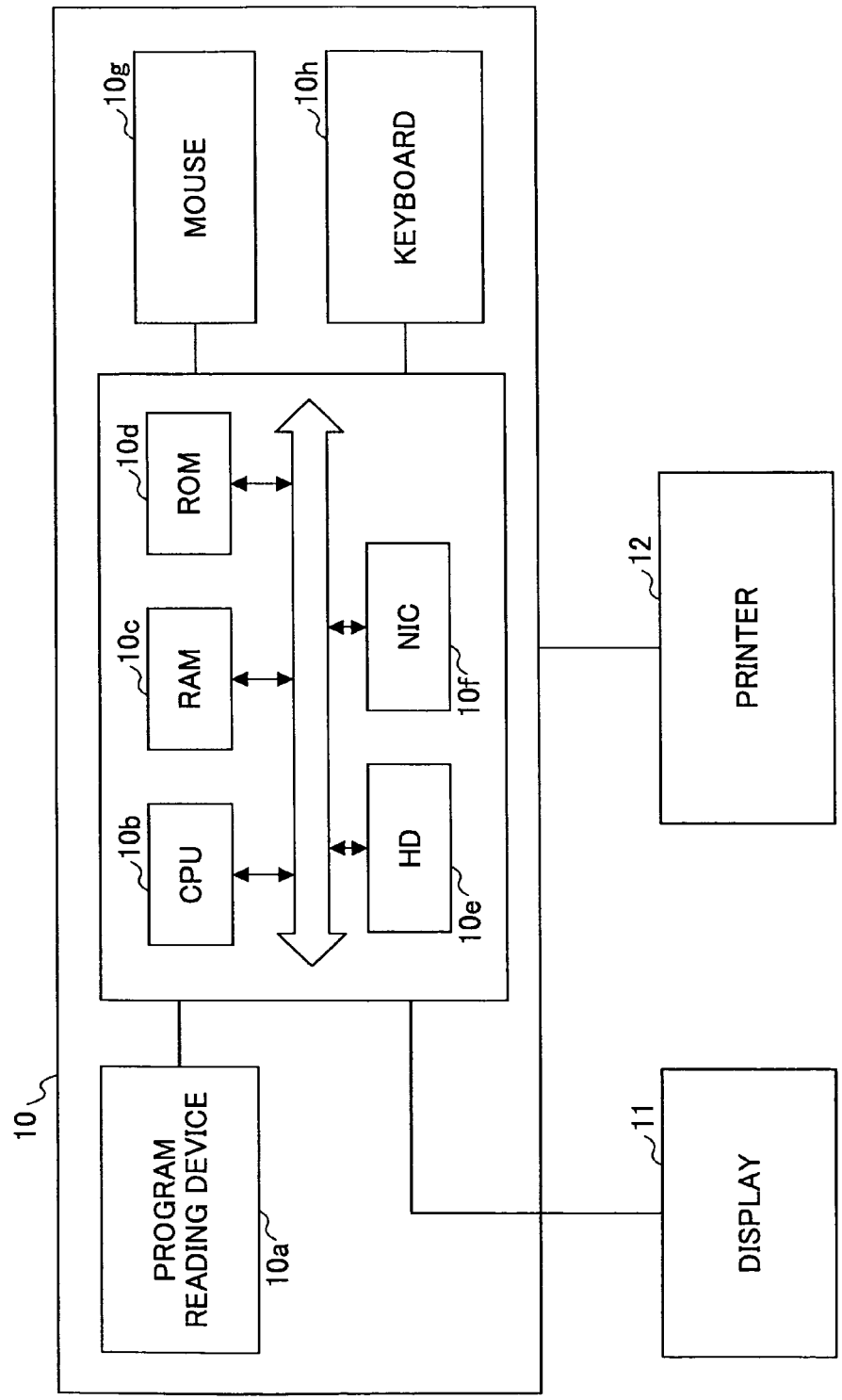
FIG. 18 is a diagram showing a hardware structure of an image processing system according to a third embodiment of the present invention.

FIG. 18 is a diagram showing a hardware structure of an image processing system according to a third embodiment of the present invention. In the image processing system, the image processing method described above is realized by software.

The image processing system is realized by a computer, for example, a workstation or a personal computer. As shown in FIG. 18, a computer 10 includes a program reading device 10*a*, a CPU (central processing unit) 10*b* which controls all elements in the computer 10, a RAM 10*c* which is used as a work area of the CPU 10*b* and so on, a ROM 10*d* which stores a control program of the CPU 10*a* and so on, an HD (hard disk) 10*e*, an NIC (network interface card) 10*f*, a mouse 10*g*, and a keyboard 10*h*. The computer 10 is connected to a display 11 which displays image data and so on, and a printer 12 (image forming apparatus).

The color profile forming function described above can be realized by the CPU 10*b*. In addition, the DB 101 can be realized by the RAM 10*c*, the ROM 10*d*, or the HD 10*e*. Further, the data of the color profile forming function to be stored in the DB 101 can be retrieved from an external device via the NIC 10*f*.

The color profile forming function described above can be supplied as a software package recorded, for example, in information recording media such as an optical disk, for example, a CD-ROM, and a magnetic disk. Therefore, the computer 10 shown in FIG. 18 includes a medium driving device (not shown) for driving the information recording medium when the information recording medium is attached to the computer 10.

The color profile forming device and the color profile forming method can be realized when a program for executing the color profile forming method recorded in an information recording medium such as a CD-ROM is read in a general-purpose computer having a display and so on, and the general-purpose computer causes a CPU in the computer to perform processes such as a color conversion process.

In this case, an image processing program for realizing the embodiments of the present invention (program which is used in a hardware system) is supplied in an information recording medium in which the image processing program has been recorded. As the information recording medium, there are, for example, a ROM, a RAM, a flash memory, and a magneto optical disk.

The program recorded in the information recording medium is installed in, for example, the HD 10*e*, and the processes such as the color conversion process can be realized by the CPU 10*b* with the use of the program.

In addition to the above, the image processing program for realizing the image processing method can be supplied from a server via a network.

Further, the present invention is not limited to the specifically disclosed embodiments, and variations and modifications may be made without departing from the scope of the present invention.

The present invention is based on Japanese Priority Patent Application No. 2008-129832, filed on May 16, 2008, with the Japanese Patent Office, the entire contents of which are hereby incorporated herein by reference.

What is claimed is:

1. An image processing apparatus which performs mapping of a color signal of a first gamut to a color signal of a second gamut on a device-independent color space, comprising:
   a processor connected to a memory;
   a first forming unit which forms a table for determining a correspondence relationship between the color signal of the first gamut and the color signal of the second gamut;

a second forming unit which forms a cross-sectional surface of the second gamut;

a mapping unit which performs mapping of the color signal of the first gamut on the cross-sectional surface of the second gamut in each predetermined hue by referring to the table;

a conversion unit which converts the color signal on the cross-sectional surface of the second gamut into an output device-dependent color signal; and an LUT (lookup table) forming unit which forms a plurality of LUTs corresponding to kinds of the tables and kinds of the cross-sectional surfaces as the LUTs for converting a device-dependent color signal corresponding to the color signal of the first gamut into the output device-dependent color signal.

2. The image processing apparatus as claimed in claim 1, further comprising:

a registering unit which registers output images to which color conversion has been applied to an input image by the plural LUTs, wherein the output images are formed of a plurality of color patch images corresponding to combinations of the kinds of the tables and the kinds of the cross-sectional surfaces in each hue of the input image.

3. The image processing apparatus as claimed in claim 2, further comprising:

a profile forming unit which includes a selection unit which selects color patch images corresponding to a hue of the input image from the color patch images to which the color conversion has been applied to the input image by the plural LUTs, and forms an LUT corresponding to the hue, the kinds of the tables, the kinds of the cross-sectional surfaces of the selected color patch images.

4. The image processing apparatus as claimed in claim 1, wherein:

the first forming unit forms the table in which the correspondence relationship between the color signals of the first gamut and the second gamut is liner or non-linear in a predetermined region.

5. The image processing apparatus as claimed in claim 1, wherein:

the first forming unit forms a table in which the mapping of the color signal of the first gamut is not performed for a predetermined region of the second gamut.

6. The image processing apparatus as claimed in claim 4, wherein:

the predetermined region includes a most outer line of the second gamut.

7. The image processing apparatus as claimed in claim 5, wherein:

the predetermined region includes a most outer line of the second gamut.

8. The image processing apparatus as claimed in claim 1, wherein:

the second forming unit forms the cross-sectional surface of the second gamut by obtaining AND between a solid model and a curved surface of the second gamut in each hue.

9. The image processing apparatus as claimed in claim 8, further comprising:

a determination unit which determines whether the curved surfaces are overlapped between adjacent hues.

10. The image processing apparatus as claimed in claim 1, wherein:

the device-independent color space is a perceptual color space including a luminance axis.

11. An image processing method which performs mapping of a color signal of a first gamut to a color signal of a second gamut on a device-independent color space, comprising the steps of:

forming, by a processor connected to a memory, a table for determining a correspondence relationship between the color signal of the first gamut and the color signal of the second gamut;

forming, by the processor connected to the memory, a cross-sectional surface of the second gamut;

performing, by the processor connected to the memory, mapping of the color signal of the first gamut on the cross-sectional surface of the second gamut in each predetermined hue by referring to the table;

converting, by the processor connected to the memory, the color signal on the cross-sectional surface of the second gamut into an output device-dependent color signal; and forming, by the processor connected to the memory, a plurality of LUTs (lookup tables) corresponding to kinds of the tables and kinds of the cross-sectional surfaces as the LUTs for converting a device-dependent color signal corresponding to the color signal of the first gamut into the output device-dependent color signal.

12. The image processing method as claimed in claim 11, further comprising the step of:

registering output images to which color conversion has been applied to an input image by the plural LUTs, wherein the output images are formed of a plurality of color patch images corresponding to combinations of the kinds of the tables and the kinds of the cross-sectional surfaces in each hue of the input image.

13. The image processing method as claimed in claim 12, further comprising the steps of:

selecting color patch images corresponding to a hue of the input image from the color patch images to which the color conversion has been applied to the input image by the plural LUTs; and forming an LUT corresponding to the hue, the kinds of the tables, the kinds of the cross-sectional surfaces of the selected color patch images.

14. The image processing method as claimed in claim 11, wherein:

the correspondence relationship in the table between the color signals of the first gamut and the second gamut is liner or non-linear in a predetermined region.

15. The image processing method as claimed in claim 11, further comprising the step of:

determining whether curved surfaces of the cross-sectional surfaces of the second gamut are overlapped between adjacent hues.

16. A computer-readable recording medium storing an image processing program for executing an image processing method which performs mapping of a color signal of a first gamut to a color signal of a second gamut on a device-independent color space, wherein the image processing program includes the steps of:

forming a table for determining a correspondence relationship between the color signal of the first gamut and the color signal of the second gamut;

forming a cross-sectional surface of the second gamut;

performing mapping of the color signal of the first gamut on the cross-sectional surface of the second gamut in each predetermined hue by referring to the table;

converting the color signal on the cross-sectional surface of the second gamut into an output device-dependent color signal; and forming a plurality of LUTs (lookup tables) corresponding to kinds of the tables and kinds of the cross-sectional surfaces as the LUTs for converting a device-dependent color signal corresponding to the color signal of the first gamut into the output device-dependent color signal.

17. The computer-readable recording medium storing the image processing program as claimed in claim 16, the image processing program further includes the step of:

registering output images to which color conversion has been applied to an input image by the plural LUTs, wherein the output images are formed of a plurality of color patch images corresponding to combinations of the kinds of the tables and the kinds of the cross-sectional surfaces in each hue of the input image.

18. The computer-readable recording medium storing the image processing program as claimed in claim 17, the image processing program further includes the step of:

selecting color patch images corresponding to a hue of the input image from the color patch images to which the color conversion has been applied to the input image by the plural LUTs; and forming an LUT corresponding to the hue, the kinds of the tables, the kinds of the cross-sectional surfaces of the selected color patch images.

19. The computer-readable recording medium storing the image processing program as claimed in claim 16, wherein:

the correspondence relationship in the table between the color signals of the first gamut and the second gamut is liner or non-linear in a predetermined region.

20. The computer-readable recording medium storing the image processing program as claimed in claim 16, the image processing program further includes the step of:

determining whether curved surfaces of the cross-sectional surfaces of the second gamut are overlapped between adjacent hues.

* * * * *